(12) United States Patent
Liang et al.

(10) Patent No.: US 11,343,056 B2
(45) Date of Patent: May 24, 2022

(54) DATA TRANSMISSION METHOD, SENDING DEVICE, AND RECEIVING DEVICE

(71) Applicant: HUAWEI TECHNOLOGIES CO., LTD., Guangdong (CN)

(72) Inventors: Jinyao Liang, Liang (CN); Peng Zhang, Shanghai (CN); Yuanjie Li, Shanghai (CN); Yubo Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 16/734,808

(22) Filed: Jan. 6, 2020

(65) Prior Publication Data

US 2020/0145174 A1 May 7, 2020

Related U.S. Application Data

(63) Continuation of application No. PCT/CN2018/087848, filed on May 22, 2018.

(30) Foreign Application Priority Data

Jul. 7, 2017 (CN) .......................... 201710552734.4

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04L 5/0096* (2013.01);
(Continued)

(58) Field of Classification Search
CPC ............................... H04L 5/10; H04L 5/0051
See application file for complete search history.

(56) References Cited

U.S. PATENT DOCUMENTS

| 2012/0093124 A1 | 4/2012 | Zhang et al. |
| 2014/0133395 A1 | 5/2014 | Nam et al. |
(Continued)

FOREIGN PATENT DOCUMENTS

| CN | 101931437 A | 12/2010 |
| CN | 106470487 A | 3/2017 |
| CN | 106559194 A | 4/2017 |
| WO | 2014098523 A1 | 6/2014 |
| WO | 2017018759 A1 | 2/2017 |

OTHER PUBLICATIONS

Huawei et al., "DL DMRS design for short TTI," 3GPP TSG RAN WG1 Meeting #89, R1-1706995, Hangzhou, China, May 15-19, 2017, 8 pages.

(Continued)

*Primary Examiner* — Shukri Taha
(74) *Attorney, Agent, or Firm* — Fish & Richardson P.C.

(57) ABSTRACT

Embodiments of this application provide example data transmission methods. One example method includes: receiving, by a receiving device, first data on a first time-frequency resource, and receiving second data on a second time-frequency resource. When the first time-frequency resource and the second time-frequency resource have an overlapped target frequency domain resource in frequency domain, the receiving device can then use a first DMRS mapped to a target frequency domain resource of the first time-frequency resource to demodulate the second data mapped to a target frequency domain resource of the second time-frequency resource.

14 Claims, 10 Drawing Sheets

(51) Int. Cl.
 *H04W 72/04* (2009.01)
 *H04W 72/12* (2009.01)

(52) U.S. Cl.
 CPC ... *H04W 72/0446* (2013.01); *H04W 72/0453* (2013.01); *H04W 72/1263* (2013.01)

(56) References Cited

U.S. PATENT DOCUMENTS

| | | | | |
|---|---|---|---|---|
| 2018/0212732 | A1* | 7/2018 | You | H04L 5/0053 |
| 2018/0278391 | A1* | 9/2018 | Zhang | H04L 5/0053 |
| 2020/0119965 | A1* | 4/2020 | Harada | H04W 72/04 |
| 2020/0404684 | A1* | 12/2020 | Lee | H04L 5/0053 |

OTHER PUBLICATIONS

ZTE, "NR-PDCCH for supporting URLLC", 3GPP TSG RAN WG1 NR Ad-Hoc#2, R1-1710111, Qingdao, P.R. China, Jun. 27-30, 2017, 7 pages.

Extended European Search Report issued in European Application No. 18827346.0 dated May 6, 2020, 9 pages.

PCT International Search Report and Written Opinion issued in International Application No. PCT/CN2018/087848 dated Aug. 13, 2018, 17 pages (with English translation).

Office Action issued in Chinese Application No. 201710552734.4 dated May 7, 2020, 7 pages.

* cited by examiner

DATA TRANSMISSION METHOD, SENDING DEVICE, AND RECEIVING DEVICE

CROSS-REFERENCE TO RELATED APPLICATIONS

This application is a continuation of International Application No. PCT/CN2018/087848, filed on May 22, 2018, which claims priority to Chinese Patent Application No. 201710552734.4, filed on Jul. 7, 2017. The disclosures of the aforementioned applications are hereby incorporated by reference in their entireties.

TECHNICAL FIELD

Embodiments of this application relate to communications technologies, and in particular, to a data transmission method, a sending device, and a receiving device.

BACKGROUND

A 5G communications system can support different services. The services may be, for example, an enhanced mobile broadband (eMBB) service, a massive machine type communication (mMTC) service, an ultra-reliable and low latency communications (URLLC) service, a multimedia broadcast multicast service (MBMS), and a positioning service. Therefore, in the 5G communications system, there is a scenario in which a plurality of services coexist in a terminal device.

When a plurality of services coexist in uplink data communication and/or downlink data communication of the terminal device, time-frequency resources that are scheduled by a network device and that are used to transmit data of the plurality of services may have an overlapped frequency domain resource. For example, the network device transmits the URLLC service and the eMBB service to the terminal device. When the network device preempts some time-frequency resources used to send eMBB service data to send URLLC service data, time-frequency resources used to send the eMBB service data and time-frequency resources used to send the URLLC service data have an overlapped frequency domain resource.

Currently, when transmitting different service data by using the plurality of time-frequency resources that have an overlapped frequency domain resource, the network device or the terminal device transmits, on each time-frequency resource, a demodulation reference signal (DMRS) used to demodulate service data transmitted on the time-frequency resource. However, the network device or the terminal device transmits the DMRS on a time-frequency resource corresponding to each service. Consequently, DMRS overheads are relatively high, and utilization of resources is relatively low.

SUMMARY

Embodiments of this application provide a data transmission method, a sending device, and a receiving device, to reduce DMRS overheads and improve utilization of resources.

According to a first aspect, an embodiment of this application provides a data transmission method. The method includes:

receiving, by a receiving device, first data on a first time-frequency resource, and receiving second data on a second time-frequency resource; and when the first time-frequency resource and the second time-frequency resource have an overlapped target frequency domain resource in frequency domain, using, by the receiving device, a first DMRS mapped to a target frequency domain resource of the first time-frequency resource to demodulate the second data mapped to a target frequency domain resource of the second time-frequency resource.

According to the data transmission method provided in the first aspect, when a sending device needs to send the first data and the second data to the receiving device separately, the sending device may send, when the first time-frequency resource and the second time-frequency resource have an overlapped target frequency domain resource, the second data to the receiving device at a location, which is originally used to send a second DMRS, on the target frequency domain resource of the second time-frequency resource. In this manner, DMRS overheads can be reduced and utilization of resources can be improved.

In a possible implementation, the receiving device is a terminal device, and the method further includes:

receiving, by the receiving device, first indication information sent by a network device, where the first indication information is used to indicate that the receiving device uses the first DMRS to demodulate the second data mapped to the target frequency domain resource of the second time-frequency resource.

According to the data transmission method provided in this possible implementation, the first indication information is received, so that the receiving device can determine, based on the first indication information, that the sending device maps, when the first time-frequency resource and the second time-frequency resource have an overlapped target frequency domain resource, the second data at the location, which is originally used to map the second DMRS, on the target frequency domain resource of the second time-frequency resource; and when the first time-frequency resource and the second time-frequency resource have an overlapped target frequency domain resource in frequency domain, the sending device uses the first DMRS mapped to the first time-frequency resource. Therefore, when the first time-frequency resource and the second time-frequency resource have an overlapped target frequency domain resource in frequency domain, the receiving device may use the first DMRS mapped to the target frequency domain resource of the first time-frequency resource to demodulate the second data mapped to the target frequency domain resource of the second time-frequency resource, thereby ensuring that the receiving device can correctly demodulate the second data, and improving data demodulation efficiency.

In a possible implementation, the using, by the receiving device, a first DMRS to demodulate the second data mapped to a target frequency domain resource of the second time-frequency resource includes:

when a spacing and a preset spacing satisfy a mapping relationship, and the first time-frequency resource and the second time-frequency resource have an overlapped target frequency domain resource in frequency domain, using, by the receiving device, the first DMRS to demodulate the second data mapped to the target frequency domain resource of the second time-frequency resource, where the spacing is a spacing between the first time-frequency resource and the second time-frequency resource.

According to the data transmission method provided in this possible implementation, the receiving device may determine, based on the first indication information and the spacing between the first time-frequency resource and the second time-frequency resource, that when first time-frequency resource and the second time-frequency resource have an overlapped target frequency domain resource, the sending device maps the second data at the location, which is originally used to map the second DMRS, on the target frequency domain resource of the second time-frequency resource; and when the first time-frequency resource and the second time-frequency resource have an overlapped target frequency domain resource in frequency domain, the sending device uses the first DMRS mapped to the first time-frequency resource. Therefore, when the first time-frequency resource and the second time-frequency resource have an overlapped target frequency domain resource in frequency domain, the receiving device may use the first DMRS mapped to the target frequency domain resource of the first time-frequency resource to demodulate the second data mapped to the target frequency domain resource of the second time-frequency resource, thereby ensuring that the receiving device can correctly demodulate the second data, and improving data demodulation efficiency.

In a possible implementation, the receiving device is a terminal device, and the method further includes:

receiving, by the receiving device, second indication information sent by a network device, where the second indication information is used to indicate the preset spacing.

According to the data transmission method provided in this possible implementation, manners in which the receiving device obtains the preset spacing are flexible and diverse, and application scenarios of the data transmission method are increased.

In a possible implementation, the preset spacing and a moving speed of the terminal device and a channel time variant parameter of the terminal device satisfy a mapping relationship.

According to the data transmission method provided in this possible implementation, manners in which the receiving device obtains the preset spacing are flexible and diverse, and application scenarios of the data transmission method are increased.

In a possible implementation, the using, by the receiving device, a first DMRS to demodulate the second data mapped to a target frequency domain resource of the second time-frequency resource includes:

when first antenna port information is the same as second antenna port information, and the first time-frequency resource and the second time-frequency resource have an overlapped target frequency domain resource in frequency domain, using, by the receiving device, the first DMRS to demodulate the second data mapped to the target frequency domain resource of the second time-frequency resource, where the first antenna port information is antenna port information used by the sending device to send the first data, and the second antenna port information is antenna port information used by the sending device to send the second data; and the first antenna port information includes a quantity of first antenna ports used by the sending device to send the first data and/or at least one first antenna port number, and the second antenna port information includes a quantity of second antenna ports used by the sending device to send the second data and/or at least one second antenna port number.

According to the data transmission method provided in this possible implementation, the receiving device can determine, by using the first antenna port information and the second antenna port information and based on the first indication information, that the sending device maps, when the first time-frequency resource and the second time-frequency resource have an overlapped target frequency domain resource, the second data at the location, which is originally used to map the second DMRS, on the target frequency domain resource of the second time-frequency resource; and when the first time-frequency resource and the second time-frequency resource have an overlapped target frequency domain resource in frequency domain, the sending device uses the first DMRS mapped to the first time-frequency resource. Therefore, when the first time-frequency resource and the second time-frequency resource have an overlapped target frequency domain resource in frequency domain, the receiving device may use the first DMRS mapped to the target frequency domain resource of the first time-frequency resource to demodulate the second data mapped to the target frequency domain resource of the second time-frequency resource, thereby ensuring that the receiving device can correctly demodulate the second data, and improving data demodulation efficiency.

In a possible implementation, the receiving device is a terminal device, and the method further includes:

receiving, by the receiving device, third indication information sent by the network device, where the third indication information is used to determine a first antenna port number corresponding to the second antenna port number; and the using, by the receiving device, a first DMRS to demodulate the second data mapped to a target frequency domain resource of the second time-frequency resource includes:

using, by the receiving device, the first DMRS transmitted by using the first antenna port number corresponding to the second antenna port number to demodulate the second data mapped to the target frequency domain resource of the second time-frequency resource.

According to the data transmission method provided in this possible implementation, when the second antenna port number used by the sending device to send the second data is different from any first antenna port number used by the sending device to send the first data, and the quantity of second antenna ports is less than the quantity of first antenna ports, the receiving device may use the first DMRS transmitted by using the first antenna port number corresponding to the second antenna port number to demodulate the second data mapped to the target frequency domain resource of the second time-frequency resource. In this manner, although signaling indication overheads are reduced, the receiving device can still determine a DMRS that is on a first antenna port number and that is used to demodulate the second data.

In a possible implementation, the third indication information includes an identifier of the first antenna port number corresponding to the second antenna port number.

According to the data transmission method provided in this possible implementation, when the second antenna port number used by the sending device to send the second data is different from any first antenna port number used by the sending device to send the first data, and the quantity of second antenna ports is less than the quantity of first antenna ports, the receiving device may determine, based on the identifier that is of the first antenna port number corresponding to the second antenna port number and that is carried in the third indication information, the first antenna port number corresponding to the second antenna port number, and therefore, may use the first DMRS transmitted by using the first antenna port number corresponding to the second antenna port number to demodulate the second data mapped to the target frequency domain resource of the second time-frequency resource. In this manner, although signaling indication overheads are reduced, the receiving device can still determine a DMRS that is on a first data antenna port number and that is used to demodulate the second data.

In a possible implementation, the using, by the receiving device, a first DMRS to demodulate the second data mapped to a target frequency domain resource of the second time-frequency resource includes:

determining, by the receiving device based on an identifier of the second antenna port number and a preset correspondence between the second antenna port number and the first antenna port number, the first antenna port number corresponding to the second antenna port number; and using, by the receiving device, the first DMRS transmitted by using the first antenna port number corresponding to the second antenna port number, to demodulate the second data mapped to the target frequency domain resource of the second time-frequency resource.

According to the data transmission method provided in this possible implementation, when the second antenna port number used by the sending device to send the second data is different from any first antenna port number used by the sending device to send the first data, and the quantity of second antenna ports is less than the quantity of first antenna ports, the receiving device may determine, based on the identifier of the second antenna port number and the preset correspondence between the second antenna port number and the first antenna port number, the first antenna port number corresponding to the second antenna port number, and therefore, may use the first DMRS transmitted by using the first antenna port number corresponding to the second antenna port number, to demodulate the second data mapped to the target frequency domain resource of the second time-frequency resource. In this manner, although signaling indication overheads are reduced, the receiving device can still determine a DMRS that is on a first data antenna port number and that is used to demodulate the second data.

In a possible implementation, the receiving device is a terminal device, and the method further includes:

receiving, by the receiving device, fourth indication information sent by the network device, where the fourth indication information is used to indicate a ratio of a transmit power of the first DMRS to a transmit power of the second data.

According to the data transmission method provided in this possible implementation, after receiving the fourth indication information, the receiving device can accurately measure channel estimation of the first DMRS based on the ratio of the transmit power of the first DMRS to the transmit power of the second data, so that the receiving device can accurately perform channel estimation on the second data based on the first DMRS, thereby improving demodulation accuracy of the second data.

According to a second aspect, an embodiment of this application provides a data transmission method. The method includes:

determining, by a sending device, a first time-frequency resource on which first data is sent and a second time-frequency resource on which second data is sent; and when the first time-frequency resource and the second time-frequency resource have an overlapped target frequency domain resource, sending, by the sending device, the second data on the target frequency domain resource of the second time-frequency resource.

In a possible implementation, the sending device is a network device, and the method further includes:

sending, by the sending device, first indication information to a terminal device, where the first indication information is used to indicate that the terminal device uses a first DMRS mapped to a target frequency domain resource of the first time-frequency resource to demodulate the second data mapped to the target frequency domain resource of the second time-frequency resource.

In a possible implementation, the sending, by the sending device, the second data on a target frequency domain resource of the second time-frequency resource includes:

when a spacing and a preset spacing satisfy a mapping relationship, and the first time-frequency resource and the second time-frequency resource have an overlapped target frequency domain resource, sending, by the sending device, the second data on the target frequency domain resource of the second time-frequency resource, where the spacing is a spacing between the first time-frequency resource and the second time-frequency resource.

In a possible implementation, the sending device is a network device, and the method further includes:

sending, by the sending device, second indication information to a terminal device, where the second indication information is used to indicate the preset spacing.

In a possible implementation, the preset spacing and a moving speed of the terminal device and a channel time variant parameter of the terminal device satisfy a mapping relationship.

In a possible implementation, the sending, by the sending device, the second data on a target frequency domain resource of the second time-frequency resource includes:

when first antenna port information is the same as second antenna port information, and the first time-frequency resource and the second time-frequency resource have an overlapped target frequency domain resource, sending, by the sending device, the second data on the target frequency domain resource of the second time-frequency resource, where the first antenna port information is antenna port information used by the sending device to send the first data, and the second antenna port information is antenna port information used by the sending device to send the second data; and the first antenna port information includes a quantity of first antenna ports used by the sending device to send the first data and/or at least one first antenna port number, and the second antenna port information includes a quantity of second antenna ports used by the sending device to send the second data and/or at least one second antenna port number.

In a possible implementation, the sending device is a network device, and the method further includes:

sending, by the sending device, third indication information to the terminal device, where the third indication information is used to determine a first antenna port number corresponding to the second antenna port number.

In a possible implementation, the third indication information includes an identifier of the first antenna port number corresponding to the second antenna port number.

In a possible implementation, the sending device is a network device, and the method further includes:

sending, by the sending device, fourth indication information to the terminal device, where the fourth indication information is used to indicate a ratio of a transmit power of the first DMRS to a transmit power of the second data.

For beneficial effects of the data transmission method provided in the second aspect and the possible implementations of the second aspect, refer to the beneficial effects of the first aspect and the possible implementations of the first aspect. Details are not described herein again.

According to a third aspect, an embodiment of this application provides a data transmission system. The system includes a sending device and a receiving device, where the sending device is configured to: map first data at a first target location on a first time-frequency resource, and map second data at a second target location on a second time-frequency resource, where the first target location does not include a time-frequency resource location of a first pilot and a target time-frequency resource, the target time-frequency resource is an overlapped time-frequency resource of the first time-frequency resource and the second time-frequency resource, the second target location does not include a time-frequency resource location of a second pilot, and the time-frequency resource location of the second pilot does not include the target time-frequency resource;

the receiving device is configured to: receive a first signal on a time-frequency resource, other than the target time-frequency resource, of the first time-frequency resource, and receive a second signal on the second time-frequency resource, where the first signal includes the first pilot and the first data, and the second signal includes the second data; and the receiving device is further configured to use the first pilot to demodulate the second data carried on the target time-frequency resource.

For beneficial effects of the data transmission system provided in the third aspect, refer to the beneficial effects of the first aspect and the possible implementations of the first aspect, and the beneficial effects of the second aspect and the possible implementations of the second aspect. Details are not described herein again.

According to a fourth aspect, an embodiment of this application provides a data transmission method. The method includes:

mapping, by a sending device, first data at a first target location on a first time-frequency resource, and mapping second data at a second target location on a second time-frequency resource, where the first target location does not include a time-frequency resource location of a first pilot and a target time-frequency resource, the target time-frequency resource is an overlapped time-frequency resource of the first time-frequency resource and the second time-frequency resource, the second target location does not include a time-frequency resource location of a second pilot, and the time-frequency resource location of the second pilot does not include the target time-frequency resource.

For beneficial effects of the data transmission method provided in the fourth aspect, refer to the beneficial effects of the second aspect and the possible implementations of the second aspect. Details are not described herein again.

According to a fifth aspect, an embodiment of this application provides a data transmission method. The method includes:

receiving, by a receiving device, a first signal on a time-frequency resource, other than a target time-frequency resource, of a first time-frequency resource, and receiving a second signal on a second time-frequency resource, where a first target location does not include a time-frequency resource location of a first pilot and the target time-frequency resource, the target time-frequency resource is an overlapped time-frequency resource of the first time-frequency resource and the second time-frequency resource, a second target location does not include a time-frequency resource location of a second pilot, the time-frequency resource location of the second pilot does not include the target time-frequency resource, the first signal includes the first pilot and first data, and the second signal includes second data; and using, by the receiving device, the first pilot to demodulate the second data carried on the target time-frequency resource.

For beneficial effects of the data transmission method provided in the fifth aspect, refer to the beneficial effects of the first aspect and the possible implementations of the first aspect. Details are not described herein again.

According to a sixth aspect, an embodiment of this application provides a receiving device. The receiving device may be a network device, a terminal device, or a chip. The receiving device may include:

a receiving module, configured to: receive first data on a first time-frequency resource, and receive second data on a second time-frequency resource; and a processing module, configured to: when the first time-frequency resource and the second time-frequency resource have an overlapped target frequency domain resource in frequency domain, use a first DMRS mapped to a target frequency domain resource of the first time-frequency resource to demodulate the second data mapped to a target frequency domain resource of the second time-frequency resource.

In a possible implementation, the receiving device is a terminal device, and the receiving module is further configured to receive first indication information sent by a network device, where the first indication information is used to indicate that the receiving device uses the first DMRS to demodulate the second data mapped to the target frequency domain resource of the second time-frequency resource.

In a possible implementation, the processing module is specifically configured to: when a spacing and a preset spacing satisfy a mapping relationship, and the first time-frequency resource and the second time-frequency resource have an overlapped target frequency domain resource in frequency domain, use the first DMRS to demodulate the second data mapped to the target frequency domain resource of the second time-frequency resource, where the spacing is a spacing between the first time-frequency resource and the second time-frequency resource.

In a possible implementation, the receiving device is a terminal device, and the receiving module is further configured to receive second indication information sent by a network device, where the second indication information is used to indicate the preset spacing.

In a possible implementation, the preset spacing and a moving speed of the terminal device and a channel time variant parameter of the terminal device satisfy a mapping relationship.

In a possible implementation, the processing module is specifically configured to: when first antenna port information is the same as second antenna port information, and the first time-frequency resource and the second time-frequency resource have an overlapped target frequency domain resource in frequency domain, use the first DMRS to demodulate the second data mapped to the target frequency domain resource of the second time-frequency resource, where the first antenna port information is antenna port information used by a sending device to send the first data, and the second antenna port information is antenna port information used by the sending device to send the second data; and the first antenna port information includes a quantity of first antenna ports used by the sending device to send the first data and/or at least one first antenna port number, and the second antenna port information includes a quantity of second antenna ports used by the sending device to send the second data and/or at least one second antenna port number.

In a possible implementation, the receiving device is a terminal device, and the receiving module is further configured to receive third indication information sent by the network device, where the third indication information is used to determine a first antenna port number corresponding to the second antenna port number; and the processing module is specifically configured to use the first DMRS transmitted by using the first antenna port number corresponding to the second antenna port number to demodulate the second data mapped to the target frequency domain resource of the second time-frequency resource.

In a possible implementation, the third indication information includes an identifier of the first antenna port number corresponding to the second antenna port number.

In a possible implementation, the processing module is specifically configured to: determine, based on an identifier of the second antenna port number and a preset correspondence between the second antenna port number and the first antenna port number, the first antenna port number corresponding to the second antenna port number, and use the first DMRS transmitted by using the first antenna port number corresponding to the second antenna port number to demodulate the second data mapped to the target frequency domain resource of the second time-frequency resource.

In a possible implementation, the receiving device is a terminal device, and the receiving module is further configured to receive fourth indication information sent by the network device, where the fourth indication information is used to indicate a ratio of a transmit power of the first DMRS to a transmit power of the second data.

For beneficial effects of the receiving device provided in the sixth aspect and the possible implementations of the sixth aspect, refer to the beneficial effects of the first aspect and the possible implementations of the first aspect. Details are not described herein again.

According to a seventh aspect, an embodiment of this application provides a sending device. The sending device may be a network device, a terminal device, or a chip. The sending device may include:

a processing module, configured to determine a first time-frequency resource on which first data is sent and a second time-frequency resource on which second data is sent, where the processing module is further configured to: when the first time-frequency resource and the second time-frequency resource have an overlapped target frequency domain resource, instruct a sending module to send the second data on a target frequency domain resource of the second time-frequency resource.

In a possible implementation, the sending device is a network device, and the sending module is further configured to send first indication information to a terminal device, where the first indication information is used to indicate that the terminal device uses a first DMRS mapped to a target frequency domain resource of the first time-frequency resource to demodulate the second data mapped to the target frequency domain resource of the second time-frequency resource.

In a possible implementation, the processing module is specifically configured to: when a spacing and a preset spacing satisfy a mapping relationship, and the first time-frequency resource and the second time-frequency resource have an overlapped target frequency domain resource, instruct the sending module to send the second data on the target frequency domain resource of the second time-frequency resource, where the spacing is a spacing between the first time-frequency resource and the second time-frequency resource.

In a possible implementation, the sending device is a network device, and the sending module is further configured to send second indication information to a terminal device, where the second indication information is used to indicate the preset spacing.

In a possible implementation, the preset spacing and a moving speed of the terminal device and a channel time variant parameter of the terminal device satisfy a mapping relationship.

In a possible implementation, the processing module is specifically configured to: when first antenna port information is the same as second antenna port information, and the first time-frequency resource and the second time-frequency resource have an overlapped target frequency domain resource, instruct the sending module to send the second data on the target frequency domain resource of the second time-frequency resource;

the first antenna port information is antenna port information used by the sending device to send the first data, and the second antenna port information is antenna port information used by the sending device to send the second data; and the first antenna port information includes a quantity of first antenna ports used by the sending device to send the first data and/or at least one first antenna port number, and the second antenna port information includes a quantity of second antenna ports used by the sending device to send the second data and/or at least one second antenna port number.

In a possible implementation, the sending device is a network device, and the sending module is further configured to send third indication information to the terminal device, where the third indication information is used to determine a first antenna port number corresponding to the second antenna port number.

In a possible implementation, the third indication information includes an identifier of the first antenna port number corresponding to the second antenna port number.

In a possible implementation, the sending device is a network device, and the sending module is further configured to send fourth indication information to the terminal device, where the fourth indication information is used to indicate a ratio of a transmit power of the first DMRS to a transmit power of the second data.

For beneficial effects of the sending device provided in the seventh aspect and the possible implementations of the seventh aspect, refer to the beneficial effects of the second aspect and the possible implementations of the second aspect. Details are not described herein again.

According to an eighth aspect, an embodiment of this application provides a sending device. The sending device may be a network device, a terminal device, or a chip. The sending device may include:

a processing module, configured to: map first data at a first target location on a first time-frequency resource, and map second data at a second target location on a second time-frequency resource, where the first target location does not include a time-frequency resource location of a first pilot and a target time-frequency resource, the target time-frequency resource is an overlapped time-frequency resource of the first time-frequency resource and the second time-frequency resource, the second target location does not include a time-frequency resource location of a second pilot, and the time-frequency resource location of the second pilot does not include the target time-frequency resource.

For beneficial effects of the sending device provided in the eighth aspect and the possible implementations of the eighth aspect, refer to the beneficial effects of the second aspect and the possible implementations of the second aspect. Details are not described herein again.

According to a ninth aspect, an embodiment of this application provides a receiving device. The sending device may be a network device, a terminal device, or a chip. The receiving device may include:

a receiving module, configured to receive a first signal on a time-frequency resource, other than a target time-frequency resource, of a first time-frequency resource, and receive a second signal on a second time-frequency resource, where a first target location does not include a time-frequency resource location of a first pilot and the target time-frequency resource, the target time-frequency resource is an overlapped time-frequency resource of the first time-frequency resource and the second time-frequency resource, a second target location does not include a time-frequency resource location of a second pilot, the time-frequency resource location of the second pilot does not include the target time-frequency resource, the first signal includes the first pilot and first data, and the second signal includes second data; and a processing module, configured to demodulate, by using the first pilot, the second data carried on the target time-frequency resource.

For beneficial effects of the receiving device provided in the ninth aspect and the possible implementations of the ninth aspect, refer to the beneficial effects of the first aspect and the possible implementations of the first aspect. Details are not described herein again.

According to a tenth aspect, an embodiment of this application provides a receiving device. The receiving device includes a processor, a memory, and a receiver. The receiver is coupled to the processor, and the processor controls a receiving action of the receiver.

The memory is configured to store computer-executable program code, and the program code includes an instruction. When the processor executes the instruction, the instruction enables the receiving device to perform the data transmission method provided in the first aspect and the possible implementations of the first aspect.

According to an eleventh aspect, an embodiment of this application provides a sending device. The sending device includes a processor, a memory, and a transmitter. The transmitter is coupled to the processor, and the processor controls a sending action of the transmitter.

The memory is configured to store computer-executable program code, and the program code includes an instruction. When the processor executes the instruction, the instruction enables the sending device to perform the data transmission method provided in the second aspect and the possible implementations of the second aspect.

According to a twelfth aspect, an embodiment of this application provides a receiving device. The receiving device includes a processor, a memory, and a receiver. The receiver is coupled to the processor, and the processor controls a receiving action of the receiver.

The memory is configured to store computer-executable program code, and the program code includes an instruction. When the processor executes e instruction, the instruction enables the receiving device to perform the data transmission method provided in the fifth aspect and the possible implementations of the fifth aspect.

According to a thirteenth aspect, an embodiment of this application provides a sending device. The sending device includes a processor, a memory, and a transmitter. The transmitter is coupled to the processor, and the processor controls a sending action of the transmitter.

The memory is configured to store computer-executable program code, and the program code includes an instruction. When the processor executes the instruction, the instruction enables the sending device to perform the data transmission method provided in the fourth aspect and the possible implementations of the fourth aspect.

A fourteenth aspect of the embodiments of this application provides a receiving device. The receiving device includes at least one processing element (or chip) configured to perform the method according to the first aspect.

A fifteenth aspect of the embodiments of this application provides a sending device. The sending device includes at least one processing element (or chip) configured to perform the method according to the second aspect.

A sixteenth aspect of the embodiments of this application provides a sending device. The sending device includes at least one processing element (or chip) configured to perform the method according to the fourth aspect.

A seventeenth aspect of the embodiments of this application provides a receiving device. The receiving device includes at least one processing element (or chip) configured to perform the method according to the fifth aspect.

An eighteenth aspect of the embodiments of this application provides a program. The program is used to perform the method according to the first aspect when being executed by a processor.

A nineteenth aspect of the embodiments of this application provides a program. The program is used to perform the method according to the second aspect when being executed by a processor.

A twentieth aspect of the embodiments of this application provides a program. The program is used to perform the method according to the fourth aspect when being executed by a processor.

A twenty-first aspect of the embodiments of this application provides a program. The program is used to perform the method according to the fifth aspect when being executed by a processor.

A twenty-second aspect of the embodiments of this application provides a program product, for example, a computer-readable storage medium, including the program according to the eighteenth aspect.

A twenty-third aspect of the embodiments of this application provides a program product, for example, a computer-readable storage medium, including the program according to the nineteenth aspect.

A twenty-fourth aspect of the embodiments of this application provides a program product, for example, a computer-readable storage medium, including the program according to the twentieth aspect.

A twenty-fifth aspect of the embodiments of this application provides a program product, for example, a computer-readable storage medium, including the program according to the twenty-first aspect.

A twenty-sixth aspect of the embodiments of this application provides a computer-readable storage medium. The computer-readable storage medium stores an instruction. When the instruction is run on a computer, the computer is enabled to perform the method according to the first aspect.

A twenty-seventh aspect of the embodiments of this application provides a computer-readable storage medium. The computer-readable storage medium stores an instruction. When the instruction is run on a computer, the computer is enabled to perform the method according to the second aspect.

A twenty-eighth aspect of the embodiments of this application provides a computer-readable storage medium. The computer-readable storage medium stores an instruction. When the instruction is run on a computer, the computer is enabled to perform the method according to the fourth aspect.

A twenty-ninth aspect of the embodiments of this application provides a computer-readable storage medium. The computer-readable storage medium stores an instruction. When the instruction is run on a computer, the computer is enabled to perform the method according to the fifth aspect.

According to the data transmission method, the sending device, and the receiving device that are provided in the embodiments of this application, when the sending device needs to send the first data and the second data to the receiving device separately, the sending device may send, when the first time-frequency resource and the second time-frequency resource have an overlapped target frequency domain resource, the second data to the receiving device at a location, which is originally used to send a second DMRS, on the target frequency domain resource of the second time-frequency resource. In this manner, DMRS overheads can be reduced and utilization of resources can be improved. If a service with relatively low reliability uses a DMRS of a service with relatively high reliability, data demodulation accuracy of the service with relatively low reliability may be improved, and a data rate of a service that does not send a DMRS may be improved. If a service with relatively high reliability uses a DMRS of a service with relatively low reliability, a data rate of a service that does not send a DMRS may be improved.

DESCRIPTION OF EMBODIMENTS

Figure 1:
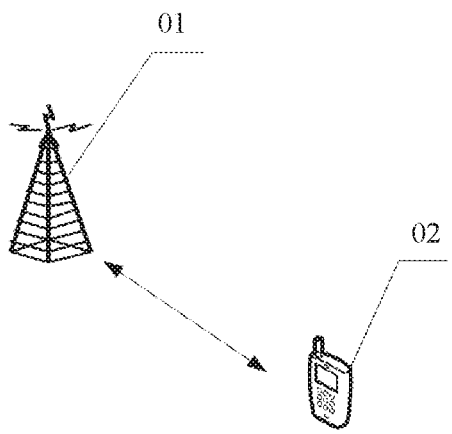
FIG. 1 is a framework diagram of a communications system according to an embodiment of this application.

FIG. 1 is a framework diagram of a communications system according to an embodiment of this application. As shown in FIG. 1, the communications system includes a network device 01 and a terminal device 02. The network device 01 and the terminal device 02 may communicate by using one or more air interface technologies.

The network device may be a base station, various radio access points, or a device that communicates in an access network with the terminal device by using one or more sectors over an air interface. The base station may be configured to: mutually convert a received over-the-air frame and an IP packet, and serve as a router between a wireless terminal and a rest portion of the access network, where the rest portion of the access network may include an internet protocol (IP) network. The base station may further coordinate attribute management of the air interface. For example, the base station may be a base transceiver station (BTS) in global system for mobile communications (GSM) or code division multiple access (CDMA), or a NodeB (NB) in wideband code division multiple access (WCDMA), or an evolved NodeB (evolved Node B, ENB, or eNodeB) in long term evolution (LTE), or a relay station or an access point, or a gNodeB gNB in a future 5G network. This is not limited herein.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile station, a remote station, a remote terminal, an access terminal, a user terminal, a user agent, or user equipment. The present invention is not limited thereto.

It should be noted that the foregoing communications system may be an LTE communications system, or may be another future communications system. This is not united herein.

Using a 5G communications system as an example, an eMBB service, a URLLC service, an mMTC service, and the like are introduced into the future 5G communications system. Therefore, in the 5G communications system, there is a scenario in which a plurality of services coexist in uplink data communication and/or downlink data communication of the terminal device. When a plurality of services coexist in the terminal device, time-frequency resources used to transmit the plurality of services may have an overlapped frequency domain resource.

Figure 2:
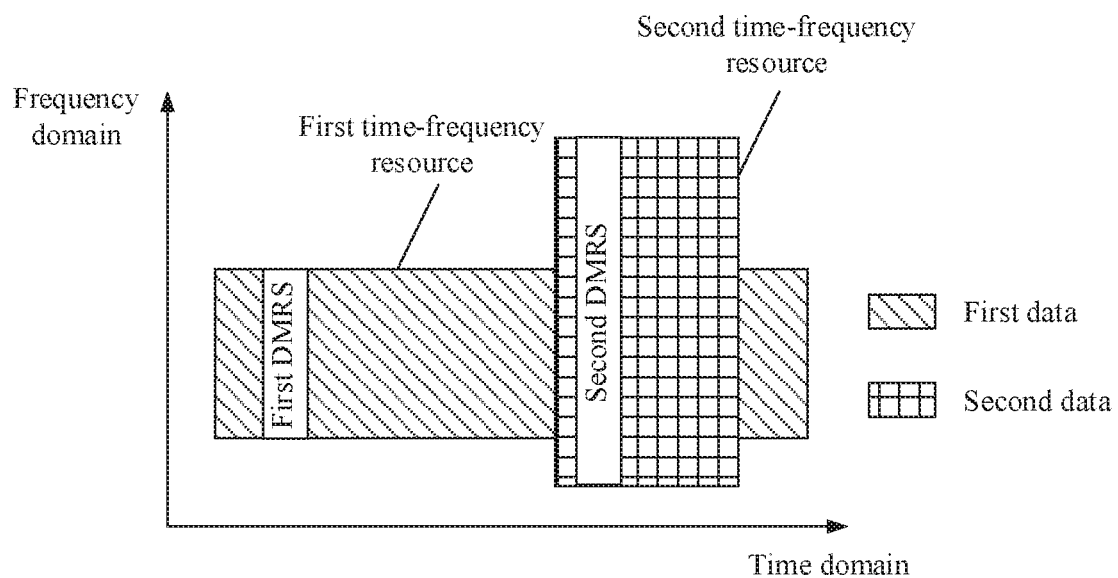
FIG. 2 is a schematic diagram of a time-frequency resource according to an embodiment of this application.

FIG. 2 is a schematic diagram of a time-frequency resource according to an embodiment of this application. As shown in FIG. 2, a scenario in which a first service and a second service coexist is used as an example. It is assumed that a first time-frequency resource on which data of the first service is mapped and a second time-frequency resource on which data of the second service is mapped have an overlapped frequency domain resource. In the prior art, when sending the data of the first service (briefly referred to as first data) on the first time-frequency resource, a sending device (such as a network device or a terminal device) sends, on all frequency domain resources of the first time-frequency resource, a first DMRS used to demodulate the first data; and when sending the data of the second service (briefly referred to as second data) on the second time-frequency resource, the sending device sends, on all frequency domain resources of the second time-frequency resource, a second DMRS used to demodulate the second data. Consequently, DMRS overheads are relatively high, and utilization of resources is relatively low. Therefore, in consideration of the foregoing problem, this embodiment of this application provides a data transmission method, to resolve the foregoing technical problem that the DMRS overheads are relatively high.

It should be noted that the sending device and a receiving device are not limited in this embodiment of this application. For example, when the sending device is a terminal device, the receiving device is a network device; or when the sending device is a network device, the receiving device is a terminal device.

It should be noted that the first service and the second service are not limited in this embodiment of this application. For example, the first service is an eMBB service, and the second service is a URLLC service; or the first service is a multimedia service, and the second service is a control information service; or the first service is a URLLC service, the second service is an eMBB service. Optionally, the second service may be a service having a relatively high delay requirement. This embodiment of this application may be applied to downlink data communication, or may be applied to uplink data communication.

It should be understood that although terms "first", "second", and the like may be used in the embodiments of this application to describe different services, the services should not be limited by these terms. These terms are merely used to distinguish between the services. For example, without departing from the scope of the embodiments of this application, the first service may alternatively be referred to as a second service. Similarly, the second service may alternatively be referred to as a first service.

It should be understood that although terms "first", "second", and the like may be used in the embodiments of this application to describe different data, the data should not be limited by these terms. The terms are only used to distinguish between the data. For example, without departing from the scope of the embodiments of this application, the first data may alternatively be referred to as second data. Similarly, the second data may alternatively be referred to as first data.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 3:
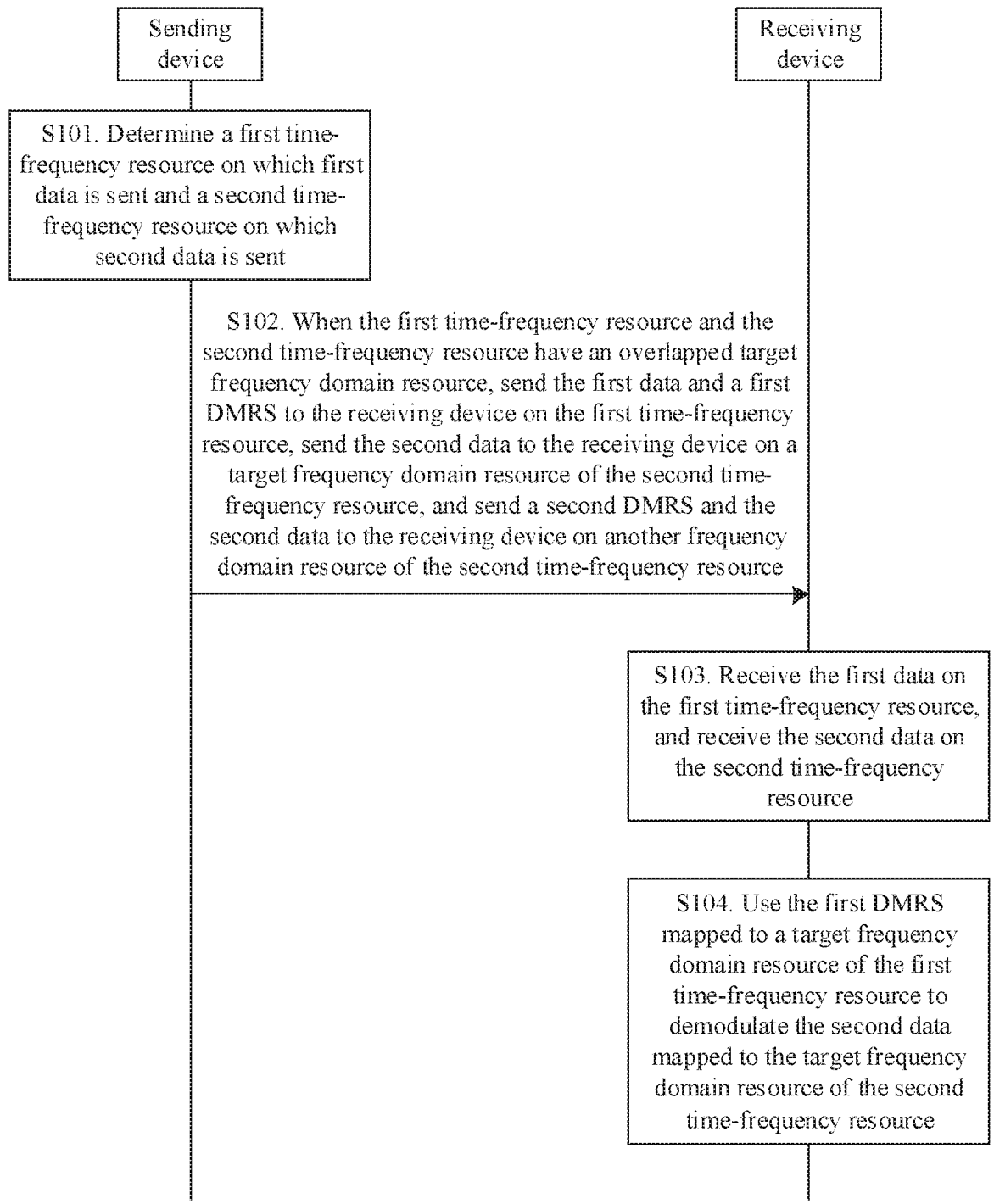
FIG. 3 is a signaling flowchart of a data transmission method according to an embodiment of this application.

A scenario in which two services (that is, a first service and a second service) coexist in a terminal device is used as an example below. The technical solutions in the embodiments of this application are described in detail by using some embodiments. The following several embodiments may be combined with each other, and a same or similar concept or process may not be described repeatedly in some embodiments, FIG. 3 is a signaling flowchart of a data transmission method according to an embodiment of this application. This embodiment relates to a process in which a sending device sends, when a first time-frequency resource and a second time-frequency resource have an overlapped target frequency domain resource, second data to a receiving device at a location, which is originally used to send a second DMRS, on a target frequency domain resource of the second time-frequency resource. As shown in FIG. 3, the method may include the following steps.

S101. The sending device determines the first time-frequency resource on which first data is sent and the second time-frequency resource on which the second data is sent.

The first data may be data of a first service, and the second data may be data of a second service. For example, the first data is data of an eMBB service, and the second data is data of a URLLC service. In this embodiment, when the sending device needs to separately send the first data and the second data to the receiving device, the sending device may determine the first time-frequency resource on which the first data is sent and the second time-frequency resource on which the second data is sent.

Optionally, when the sending device is a terminal device, the sending device may receive downlink control information (DCI) that is sent by a network device and that is used to indicate the first time-frequency resource and DCI that is sent by the network device and that is used to indicate the second time-frequency resource, to obtain the first time-frequency resource and the second time-frequency resource. Details are not described herein.

S102. When the first time-frequency resource and the second time-frequency resource have an overlapped target frequency domain resource, the sending device sends the first data and a first DMRS to the receiving device on the first time-frequency resource, sends the second data to the receiving device on the target frequency domain resource of the second time-frequency resource, and sends a second DMRS and the second data to the receiving device on another frequency domain resource of the second time-frequency resource.

Specifically, a same frequency domain resource corresponds to a same subcarrier. Therefore, when the first time-frequency resource and the second time-frequency resource have an overlapped target frequency domain resource, a subcarrier used by the sending device to transmit data on a target frequency domain resource of the first time-frequency resource is the same as a subcarrier used by the sending device to transmit data on the target frequency domain resource of the second time-frequency resource. Because channel features are the same when data is transmitted by using a same subcarrier, the receiving device can still demodulate, by using the first DMRS transmitted by the sending device on the target frequency domain resource of the first time-frequency resource, the second data transmitted on the target frequency domain resource of the second time-frequency resource.

Therefore, when the first time-frequency resource and the second time-frequency resource have an overlapped target frequency domain resource, the sending device may map the first DMRS and the first data on the first time-frequency resource still in an existing manner. However, for the second time-frequency resource, the sending device may map the second data at the location, which is originally used to map the second DMRS, on the target frequency domain resource of the second time-frequency resource, and map the second DMRS and the second data on another frequency domain resource of the second time-frequency resource still in the existing manner. In this manner, the sending device may transmit the second data on a time-frequency resource originally used to transmit the second DMRS, thereby reducing DMRS overheads, and improving utilization of resources.

A manner in which the sending device maps the second data on the second time-frequency resource is not limited in this embodiment. For example, the sending device may first determine available resource elements (RE) used to map the second data. The available REs may include the time-frequency resource, which is originally used to map the second DMRS, on the target frequency domain resource of the second time-frequency resource. Subsequently, the sending device may perform mapping on the available REs according to an RE mapping rule of a layer first, then a time domain, and finally a frequency domain, or a layer first, then a frequency domain, and finally a time domain, or a time domain first, then a frequency domain, and finally a layer, or a frequency domain first, then a time domain, and finally a layer.

Alternatively, the sending device may first determine a first available RE used to map the second data. The first available RE does not include the time-frequency resource, which is originally used to map the second DMRS, on the target frequency domain resource of the second time-frequency resource. Subsequently, the sending device may perform mapping on the first available RE according to an RE mapping rule of a layer first, then a time domain, and finally a frequency domain, or a layer first, then a frequency domain, and finally a time domain, or a time domain first, then a frequency domain, and finally a layer, or a frequency domain first, then a time domain, and finally a layer. Then, the sending device performs, according to the RE mapping rule of a layer first, then a time domain, and finally a frequency domain, or a layer first, then a frequency domain, and finally a time domain, or a time domain first, then a frequency domain, and finally a layer, or a frequency domain first, then a time domain, and finally a layer, mapping on the time-frequency resource, which is originally used to map the second DMRS, on the target frequency domain resource of the second time-frequency resource.

S103. The receiving device receives the first data on the first time-frequency resource, and receives the second data on the second time-frequency resource.

S104. The receiving device uses the first DMRS mapped to the target frequency domain resource of the first time-frequency resource to demodulate the second data mapped to the target frequency domain resource of the second time-frequency resource.

Specifically, the receiving device may learn, based on the first time-frequency resource and the second time-frequency resource, whether the first time-frequency resource and the second time-frequency resource have an overlapped target frequency domain resource. When the first time-frequency resource and the second time-frequency resource have an overlapped target frequency domain resource, the receiving device may determine that the sending device has not mapped the second DMRS on the target frequency domain resource of the second time-frequency resource. Therefore, in this scenario, the receiving device may use the first DMRS mapped to the target frequency domain resource of the first time-frequency resource to demodulate the second data mapped to the target frequency domain resource of the second time-frequency resource, and use the second DMRS mapped to the another frequency domain resource of the second time-frequency resource to demodulate the second data mapped to the another frequency domain resource of the second time-frequency resource.

Optionally, when the receiving device is a terminal device, the receiving device may receive downlink control information (DCI) that is sent by a network device and that is used to indicate the first time-frequency resource and DCI that is sent by the network device and that is used to indicate the second time-frequency resource, to obtain the first time-frequency resource and the second time-frequency resource. Details are not described herein.

According to the data transmission method provided in this embodiment of this application, when the sending device needs to send the first data and the second data to the receiving device separately, the sending device may send, when the first time-frequency resource and the second time-frequency resource have an overlapped target frequency domain resource, the second data to the receiving device at the location, which is originally used to send the second DMRS, on the target frequency domain resource of the second time-frequency resource. In this manner, DMRS overheads can be reduced and utilization of resources can be improved. If a service with relatively low reliability uses a DMRS of a service with relatively high reliability, data demodulation accuracy of the service with relatively low reliability may be improved, and a data rate of a service that does not send a DMRS may be improved. If a service with relatively high reliability uses a DMRS of a service with relatively low reliability, a data rate of a service that does not send a DMRS may be improved.

The data transmission method provided in this embodiment of this application is described below with reference to several specific scenarios.

Figure 4:
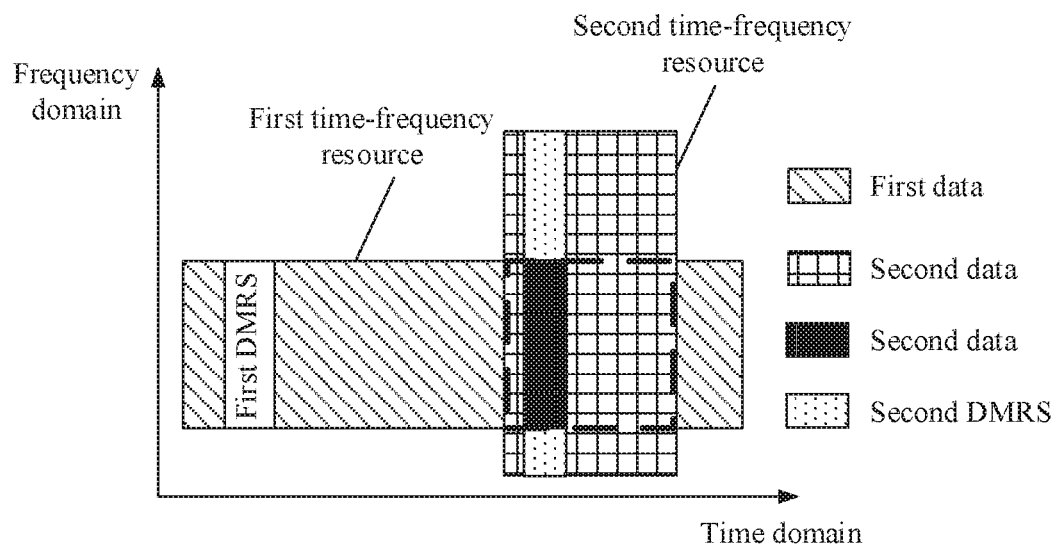
FIG. 4 is a schematic diagram of another time-frequency resource according to an embodiment of this application.
Figure 5:
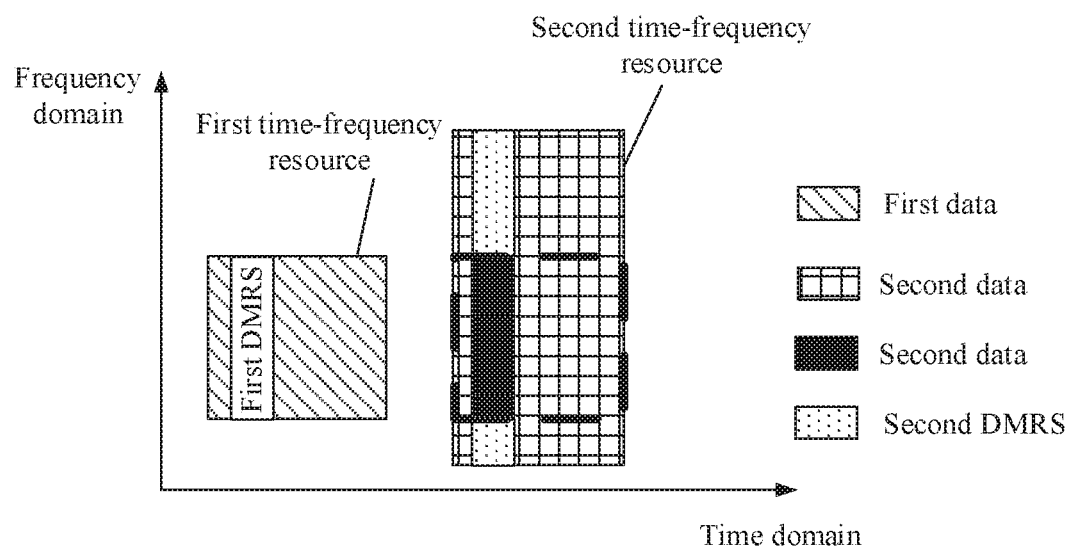
FIG. 5 is a schematic diagram of still another time-frequency resource according to an embodiment of this application.

In a first scenario, FIG. 4 is a schematic diagram of another time-frequency resource according to an embodiment of this application. FIG. 5 is a schematic diagram of still another time-frequency resource according to an embodiment of this application. FIG. 4 shows that the foregoing network device schedules a first service and a second service by using different slots. FIG. 5 shows that the foregoing network device schedules the first service and the second service by using a same slot. As shown in FIG. 4 and FIG. 5 when a bandwidth used by the network device to schedule second data is greater than a bandwidth used by the network device to schedule first data, frequency domain resources of the second time-frequency resource may completely overlap all frequency domain resources of the first time-frequency resource. In this scenario, the target frequency domain resource of the first time-frequency resource is all the frequency domain resources of the first time-frequency resource, and the target frequency domain resource of the second time-frequency resource is the overlapped portion (to be specific, the frequency domain resource corresponding to dashed-line boxes in FIG. 4 and FIG. 5) between the target frequency domain resource of the second time-frequency resource and all the frequency domain resources of the first time-frequency resource.

Therefore, the sending device may map the first DMRS and the first data on the first time-frequency resource still in an existing manner. The sending device may map the second data on the target frequency domain resource of the second time-frequency resource, and map the second DMRS and the second data on another frequency domain resource of the second time-frequency resource still in the existing manner. In other words, the sending device also maps the second data at the location (that is, black areas in FIG. 4 and FIG. 5), which is originally used to map the second DMRS, on the target frequency domain resource of the second time-frequency resource. Correspondingly, after receiving the first data sent by the sending device on the first time-frequency resource and the second data sent by the sending device on the second time-frequency resource, the receiving device may use the first DMRS mapped to the target frequency domain resource of the first time-frequency resource (that is, the first DMRS mapped to all the frequency domain resources of the first time-frequency resource) to demodulate the second data transmitted on the target frequency domain resource of the second time-frequency resource (that is, the second data mapped to the time-frequency resources in the dashed-line boxes in FIG. 4 and FIG. 5), and use the second DMRS mapped to the another frequency domain resource of the second time-frequency resource to demodulate the second data mapped to the another frequency domain resource of the second time-frequency resource.

In this manner, the sending device may transmit the second data on time-frequency resource originally used to transmit the second DMRS, thereby reducing DMRS overheads, and improving utilization of resources.

Figure 6:
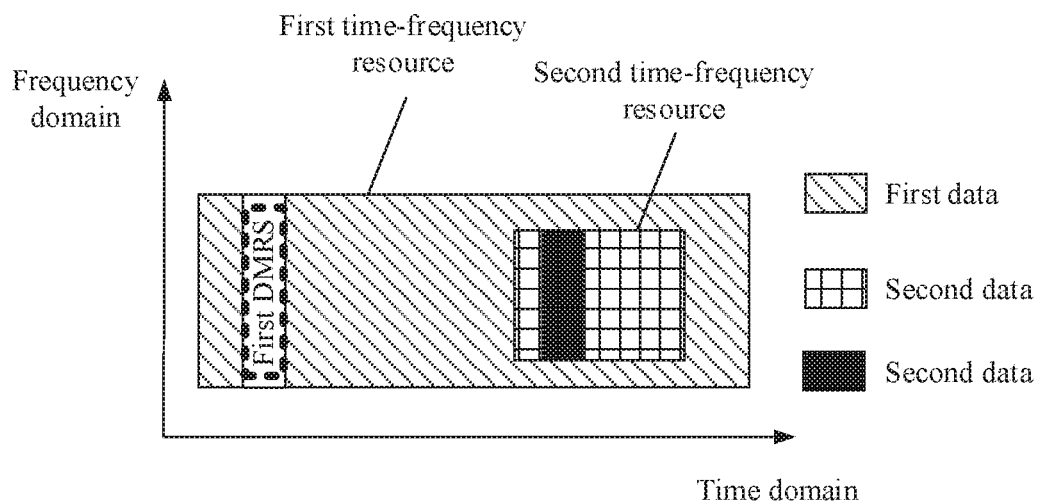
FIG. 6 is a schematic diagram of still another time-frequency resource according to an embodiment of this application.
Figure 7:
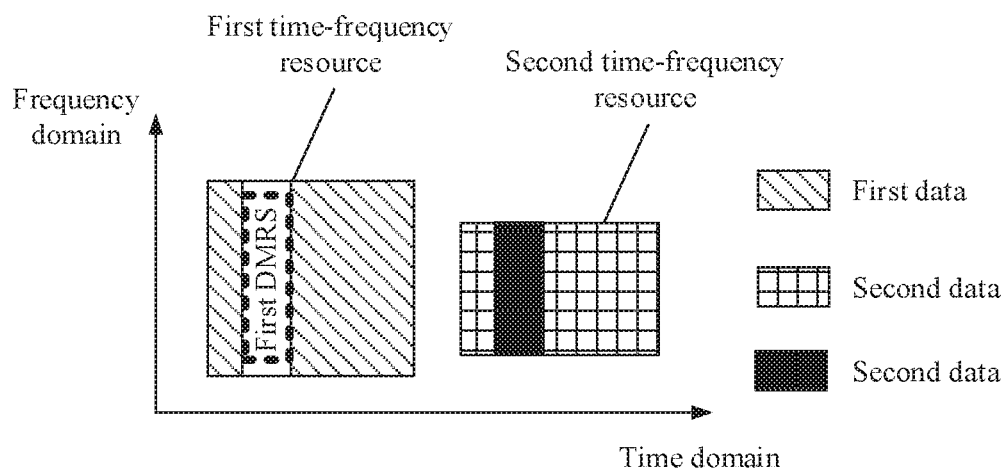
FIG. 7 is a schematic diagram of still another time-frequency resource according to an embodiment of this application.

In a second scenario, FIG. 6 is a schematic diagram of still another time-frequency resource according to an embodiment of this application. FIG. 7 is a schematic diagram of still another time-frequency resource according to an embodiment of this application. FIG. 6 shows that the foregoing network device schedules a first service and a second service by using different slots. FIG. 7 shows that the foregoing network device schedules the first service and the second service by using a same slot. As shown in FIG. 6 and FIG. 7, when a bandwidth used by the network device to schedule second data is less than a bandwidth used by the network device to schedule first data, frequency domain resources of the first time-frequency resource may completely overlap all frequency domain resources of the second time-frequency resource. In this scenario, the target frequency domain resource of the second time-frequency resource is all the frequency domain resources of the second time-frequency resource, and the target frequency domain resource of the first time-frequency resource is the overlapped portion between the target frequency domain resource of the first time-frequency resource and all the frequency domain resources of the second time-frequency resource.

Therefore, the sending device may map the first DMRS and the first data on the first time-frequency resource still in an existing manner. The sending device may map the second data on the target frequency domain resource of the second time-frequency resource (that is, all the frequency domain resources of the second time-frequency resource), and no longer maps the second DMRS. In other words, the sending device also maps the second data at the location (that is, black areas in FIG. 6 and FIG. 7), which is originally used to map the second DMRS, on the target frequency domain resource of the second time-frequency resource. Correspondingly, after receiving the first data sent by the sending device on the first time-frequency resource and the second data sent by the sending device on the second time-frequency resource, the receiving device may use the first DMRS mapped to the target frequency domain resource of the first time-frequency resource (that is, the first DMRS mapped to the time-frequency resources in dashed-line boxes in FIG. 6 and FIG. 7) to demodulate the second data transmitted on all the frequency domain resources of the second time-frequency resource.

In this manner, the sending device may transmit the second data on the time-frequency resource originally used to transmit the second DMRS, thereby reducing DMRS overheads, and improving utilization of resources.

Figure 8:
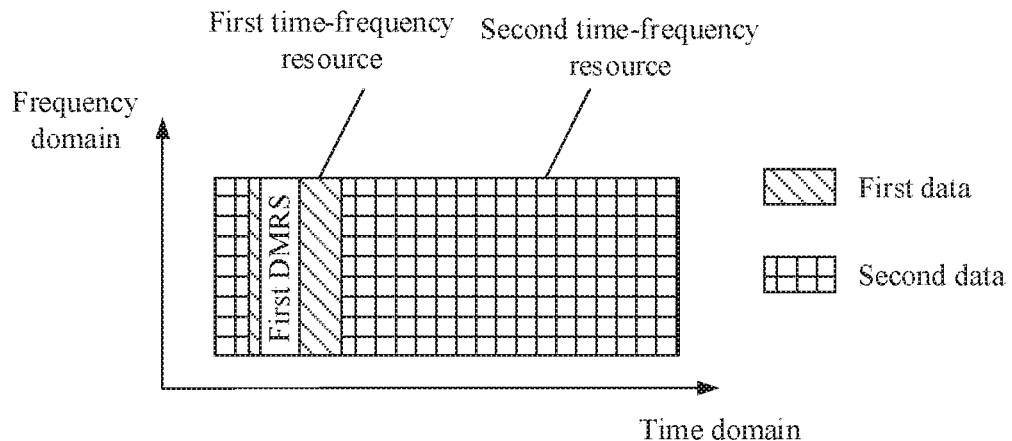
FIG. 8 is a schematic diagram of still another time-frequency resource according to an embodiment of this application.
Figure 9:
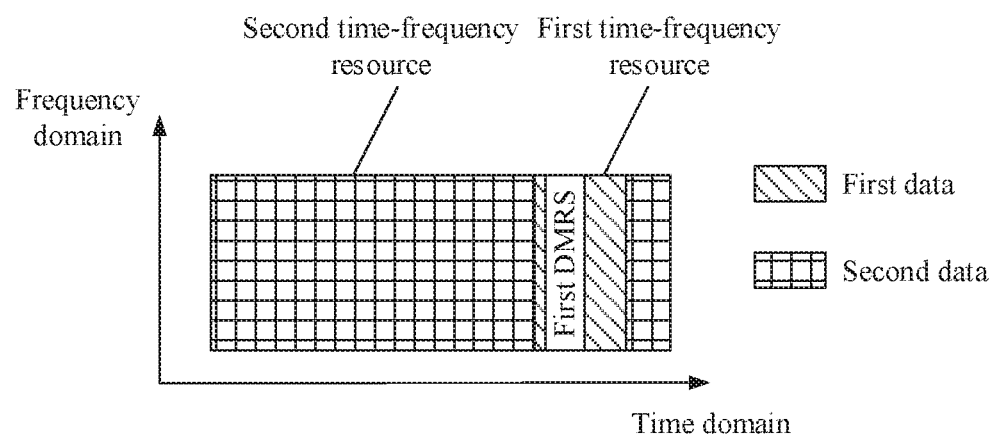
FIG. 9 is a schematic diagram of still another time-frequency resource according to an embodiment of this application.

In a third scenario, FIG. 8 is a schematic diagram of still another time-frequency resource according to an embodiment of this application, FIG. 9 is a schematic diagram of still another time-frequency resource according to an embodiment of this application. FIG. 8 and FIG. 9 show that the foregoing network device schedule a first service and a second service by using different slots. As shown in FIG. 8 and FIG. 9, for example, a bandwidth used by the network device to schedule second data is the same as a bandwidth used by the network device to schedule first data, in other words, the target frequency domain resource of the second time-frequency resource is all frequency domain resources of the second time-frequency resource, and the target frequency domain resource of the first time-frequency resource is all frequency domain resources of the first time-frequency resource.

It is assumed that the first service preempts a part of time-frequency resources of the second service, and the part of time-frequency resources include the time-frequency resource on which the second DMRS is mapped, in other words, the network device re-schedules, to the first service, the time-frequency resource that is of the second time-frequency resource and on which the second DMRS is mapped. In this case, the first time-frequency resource includes the time-frequency resource that is of the second time-frequency resource and that is originally used to map the second DMRS. The second DMRS may be a front-loaded second DMRS, or may be an additional second DMRS. FIG. 8 shows a scenario in which the first time-frequency resource includes a time-frequency resource that is of the second time-frequency resource and that is originally used to map a front-loaded second DMRS. FIG. 9 shows a scenario in which the first time-frequency resource includes a time-frequency resource that is of the second time-frequency resource and that is originally used to map an additional second DMRS.

In this scenario, the sending device may map the first DMRS and the first data on the first time-frequency resource still in an existing manner. In this case, because the location, which is originally used to map the second DMRS, on the second time-frequency resource is preempted by the first service, the sending device can map the second data only on the target frequency domain resource of the second time-frequency resource (that is, all the frequency domain resources of the second time-frequency resource), and cannot map the second DIMS. In this scenario, after receiving the first data sent by the sending device on the first time-frequency resource and the second data sent by the sending device on the second time-frequency resource, the receiving device may use the first DMRS mapped to the target frequency domain resource of the first time-frequency resource to demodulate the second data transmitted on the target frequency domain resource of the second time-frequency resource. In this manner, after the first service preempting the time-frequency resource that is of the second time-frequency resource and that is used to map the second DMRS is sent, the receiving device may use the first DMRS to demodulate the second data, thereby improving data transmission efficiency.

Further, based on the foregoing embodiment, this embodiment relates to a process of how the receiving device determines to use the first DMRS mapped to the target frequency domain resource of the first time-frequency resource to demodulate the second data mapped to the target frequency domain resource of the second time-frequency resource. Specifically, Manner 1: When the receiving device is a terminal device and the sending device is a network device, the receiving device may determine, based on first indication information sent by the sending device, whether to use the first DMRS mapped to the target frequency domain resource of the first time-frequency resource to demodulate the second data mapped to the target frequency domain resource of the second time-frequency resource.

Specifically, the sending device may send the first indication information to the receiving device. The first indication information is used to indicate that when the first time-frequency resource and the second time-frequency resource have an overlapped target frequency domain resource, the receiving device uses the first DMRS mapped to the target frequency domain resource of the first time-frequency resource to demodulate the second data mapped to the target frequency domain resource of the second time-frequency resource.

After the receiving device receives the first indication information, it indicates that when the first time-frequency resource and the second time-frequency resource have an overlapped target frequency domain resource, the sending device maps the second data at the location, which is originally used to map the second DMRS, on the target frequency domain resource of the second time-frequency resource. Therefore, when the first time-frequency resource and the second time-frequency resource have an overlapped target frequency domain resource in frequency domain, the receiving device may determine, based on the first indication information, to use the first DMRS mapped to the target frequency domain resource of the first time-frequency resource to demodulate the second data mapped to the target frequency domain resource of the second time-frequency resource.

During specific implementation, the sending device may send the first indication information to the receiving device by using higher layer signaling or physical layer signaling, or the sending device may send the first indication information to the receiving device by using downlink control signaling (for example, DCI).

Manner 2: The sending device may determine, based on a spacing between the first time-frequency resource and the second time-frequency resource, whether to send the second data on the target frequency domain resource of the second time-frequency resource when the first time-frequency resource and the second time-frequency resource have an overlapped target frequency domain resource in frequency domain. Correspondingly, the receiving device may determine, based on the spacing between the first time-frequency resource and the second time-frequency resource, whether to use, when the first time-frequency resource and the second time-frequency resource have an overlapped target frequency domain resource in frequency domain, the first DMRS mapped to the target frequency domain resource of the first time-frequency resource to demodulate the second data mapped to the target frequency domain resource of the second time-frequency resource.

Specifically, after determining the first time-frequency resource and the second time-frequency resource, the sending device may determine the spacing between the first time-frequency resource and the second time-frequency resource based on the first time-frequency resource and the second time-frequency resource. For example, the spacing may be a spacing between a start location of a time domain of the first time-frequency resource and a start location of a time domain of the second time-frequency resource, may be a spacing between an end location of a time domain of the first time-frequency resource and an end location of a time domain of the second time-frequency resource, may be a spacing between a time domain location that is on the first time-frequency resource and at which the first DMRS is mapped and a time domain location that is on the second time-frequency resource and at which the second DMRS is mapped, or may be a time spacing that is determined in another existing manner and that is between the first time-frequency resource and the second time-frequency resource.

When the spacing and a preset spacing satisfy a mapping relationship, the sending device determines to map, when the first time-frequency resource and the second time-frequency resource have an overlapped target frequency domain resource, the second data at the location, which is originally used to map the second DMRS, on the target frequency domain resource of the second time-frequency resource. When the spacing and the preset spacing do not satisfy the mapping relationship, the sending device still determines to map, when the first time-frequency resource and the second time-frequency resource have an overlapped target frequency domain resource, the second DMRS at the location, which is originally used to map the second DMRS, on the target frequency domain resource of the second time-frequency resource. The mapping relationship may be, for example, the spacing being less than or equal to the preset spacing, or the spacing being less than or equal to a half of the preset spacing.

Correspondingly, the receiving device may determine the spacing between the first time-frequency resource and the second time-frequency resource based on the first time-frequency resource and the second time-frequency resource. For an implementation thereof, refer to the description of determining the spacing between the first time-frequency resource and the second time-frequency resource by the sending device. Details are not described herein again.

When the spacing and the preset spacing satisfy the mapping relationship, it indicates that the sending device maps, when the first time-frequency resource and the second time-frequency resource have an overlapped target frequency domain resource, the second data at the location, which is originally used to map the second DMRS, on the target frequency domain resource of the second time-frequency resource. Therefore, when the spacing is less than or equal to the preset spacing, the receiving device may determine to use, when the first time-frequency resource and the second time-frequency resource have an overlapped target frequency domain resource, the first DMRS mapped to the target frequency domain resource of the first time-frequency resource to demodulate the second data mapped to the target frequency domain resource of the second time-frequency resource.

When the spacing and the preset spacing do not satisfy the mapping relationship, it indicates that when the first time-frequency resource and the second time-frequency resource have an overlapped target frequency domain resource, the sending device does not map the second data at the location, which is originally used to map the second DMRS, on the target frequency domain resource of the second time-frequency resource, but still maps the second DMRS. Therefore, when the spacing is greater than the preset spacing, the receiving device may determine not to use, when the first time-frequency resource and the second time-frequency resource have an overlapped target frequency domain resource, the first DMRS mapped to the target frequency domain resource of the first time-frequency resource to demodulate the second data mapped to the target frequency domain resource of the second time-frequency resource.

Optionally, the preset spacing may be a protocol-predefined spacing. In some embodiments, when the receiving device is a terminal device and the sending device is a network device, the sending device may further send second indication information to the receiving device. The second indication information is used to indicate the preset spacing. Therefore, the receiving device may obtain the preset spacing by receiving the second indication information sent by the sending device. During specific implementation, the sending device may send the second indication information to the receiving device by using higher layer signaling or physical layer signaling, or the sending device may send the second indication information to the receiving device by using downlink control signaling (for example, DCI). In some embodiments, the receiving device may further determine the preset spacing based on a moving speed of the terminal device and a channel time variant parameter of the terminal device. In other words, the preset spacing and the moving speed of the terminal device and the channel time variant parameter of the terminal device satisfy a mapping relationship. For example, the preset spacing is in inverse proportion to the moving speed of the terminal device. For example, when the moving speed is 3 km/h, the preset spacing is 3 symbols; and when the moving speed is 9 km/h, the preset spacing is 1 symbol. For example, the preset spacing is in inverse proportion to a doppler spread of a channel, where the doppler spread describes the channel variant parameter. For example, the preset spacing is in inverse proportion to a product of the moving speed of the terminal device and the channel time variant parameter.

For example, the spacing between the first time-frequency resource and the second time-frequency resource is the spacing between the start location of the time domain of the first time-frequency resource and the start location of the time domain of the second time-frequency resource, and the mapping relationship between the spacing and the preset spacing is that the spacing is less than or equal to the preset spacing. It is assumed that the preset spacing is 3 symbols. If the sending device determines, based on the start location of the time domain of the first time-frequency resource and the start location of the time domain of the second time-frequency resource, that the spacing between the start location of the time domain of the first time-frequency resource and the start location of the time domain of the second time-frequency resource is 2 symbols, the sending device may determine to map the second data at the location, which is originally used to map the second DMRS, on the target frequency domain resource of the second time-frequency resource. Correspondingly, if the receiving device determines, based on the start location of the time domain of the first time-frequency resource and the start location of the time domain of the second time-frequency resource, that the spacing between the start location of the time domain of the first time-frequency resource and the start location of the time domain of the second time-frequency resource is 2 symbols, the receiving device may determine to use, when the second DMRS is not detected on the target frequency domain resource of the second time-frequency resource, the first DMRS mapped to the target frequency domain resource of the first time-frequency resource to demodulate the second data mapped to the target frequency domain resource of the second time-frequency resource.

If the sending device determines, based on the start location of the time domain of the first time-frequency resource and the start location of the time domain of the second time-frequency resource, that the spacing between the start location of the time domain of the first time-frequency resource and the start location of the time domain of the second time-frequency resource is 4 symbols, the sending device may determine to still map the second DMRS at the location, which is originally used to map the second DMRS, on the target frequency domain resource of the second time-frequency resource. Correspondingly, if the receiving device determines, based on the start location of the time domain of the first time-frequency resource and the start location of the time domain of the second time-frequency resource, that the spacing between the start location of the time domain of the first time-frequency resource and the start location of the time domain of the second time-frequency resource is 4 symbols, the receiving device may determine not to use, when the second DMRS is not detected on the target frequency domain resource of the second time-frequency resource, the first DMRS mapped to the target frequency domain resource of the first time-frequency resource to demodulate the second data mapped to the target frequency domain resource of the second time-frequency resource.

Manner 3: The sending device may determine, based on the first antenna port information used to send the first data and the second antenna port information used to send the second data, whether to send the second data on the target frequency domain resource of the second time-frequency resource when the first time-frequency resource and the second time-frequency resource have an overlapped target frequency domain resource in frequency domain. Correspondingly, the receiving device may determine, based on the first antenna port information and the second antenna port information, whether to use, when the first time-frequency resource and the second time-frequency resource have an overlapped target frequency domain resource in frequency domain, the first DMRS mapped to the target frequency domain resource of the first time-frequency resource to demodulate the second data mapped to the target frequency domain resource of the second time-frequency resource.

The first antenna port information may include a quantity of first antenna ports and/or at least one first antenna port number that are used when the sending device sends the first data. The second antenna port information may include a quantity of second antenna ports and/or at least one second antenna port number that are used when the sending device sends the second data.

When the first antenna port information is the same as the second antenna port information, the sending device may determine, when the first time-frequency resource and the second time-frequency resource have an overlapped target frequency domain resource, to map the second data at the location, which is originally used to map the second DMRS, on the target frequency domain resource of the second time-frequency resource. When the first antenna port information is different from the second antenna port information, the sending device may determine, when the first time-frequency resource and the second time-frequency resource have an overlapped target frequency domain resource, to still map the second DMRS at the location, which is originally used to map the second DMRS, on the target frequency domain resource of the second time-frequency resource.

Correspondingly, the receiving device may determine, based on the first antenna port information and the second antenna port information, whether to use the first DMRS mapped to the target frequency domain resource of the first time-frequency resource to demodulate the second data mapped to the target frequency domain resource of the second time-frequency resource.

When the first antenna port information is the same as the second antenna port information, it indicates that when the first time-frequency resource and the second time-frequency resource have an overlapped target frequency domain resource, the sending device maps the second data at the location, which is originally used to map the second DMRS, on the target frequency domain resource of the second time-frequency resource. Therefore, when the first antenna port information is the same as the second antenna port information, the receiving device determines to use, when the first time-frequency resource and the second time-frequency resource have an overlapped target frequency domain resource in frequency domain, the first DMRS mapped to the target frequency domain resource of the first time-frequency resource to demodulate the second data mapped to the target frequency domain resource of the second time-frequency resource.

When the first antenna port information is different from the second antenna port information, it indicates that when the first time-frequency resource and the second time-frequency resource have an overlapped target frequency domain resource, the sending device does not map the second data at the location, which is originally used to map the second DMRS, on the target frequency domain resource of the second time-frequency resource, but still maps the second DMRS. Therefore, when the first antenna port information is different from the second antenna port information, the receiving device may determine not to use, when the first time-frequency resource and the second time-frequency resource have an overlapped target frequency domain resource in frequency domain, the first DMRS mapped to the target frequency domain resource of the first time-frequency resource to demodulate the second data mapped to the target frequency domain resource of the second time-frequency resource.

During specific implementation, the sending device may obtain the first antenna port information and the second antenna port information in an existing manner. For example, when the sending device is a terminal device and the receiving device is a network device, the sending device may receive DCI that is sent by the receiving device and that is used to indicate the first antenna port information and DCI that is sent by the receiving device and that is used to indicate the second antenna port information, to obtain the first antenna port information and the second antenna port information. Details are not described herein. Correspondingly, when the receiving device is a terminal device and the sending device is a network device, the receiving device may receive DCI that is sent by the sending device and that is used to indicate the first antenna port information and DCI that is sent by the sending device and that is used to indicate the second antenna port information, to obtain the first antenna port information and the second antenna port information. Details are not described herein.

According to the data transmission method provided in this embodiment of this application, when the sending device needs to send the first data and the second data to the receiving device separately, the sending device may send, when the first time-frequency resource and the second time-frequency resource have an overlapped target frequency domain resource, the second data to the receiving device at the location, which is originally used to send the second DMRS, on the target frequency domain resource of the second time-frequency resource. In this manner, DMRS overheads can be reduced and utilization of resources can be improved.

Further, based on the foregoing embodiment, this embodiment relates to a process in which the receiving device uses the first DMRS transmitted by using the first antenna port number corresponding to the second antenna port number to demodulate the second data mapped to the target frequency domain resource of the second time-frequency resource. In this case, S104 may include the following two cases.

Case 1: The second antenna port number used by the sending device to send the second data is a subset of any first antenna port number used by the sending device to send the first data.

In this implementation, the receiving device may use the first DMRS that is mapped to the target frequency domain resource of the first time-frequency resource and that is transmitted by using the first antenna port number the same as the second antenna port number, to demodulate the second data that is mapped to the target frequency domain resource of the second time-frequency resource and that is transmitted by using the second antenna port number.

For example, assuming that first antenna port numbers include a port 7, a port 8, a port 11, and a port 13, and second antenna port numbers include the port 7 and the port 8, the receiving device may use a first DMRS that is mapped to the target frequency domain resource of the first time-frequency resource and that is transmitted by using the port 7, to demodulate second data that is mapped to the target frequency domain resource of the second time-frequency resource and that is transmitted by using the port 7, and use a first DMRS that is mapped to the target frequency domain resource of the first time-frequency resource and that is transmitted by using the port 8, to demodulate second data that is mapped to the target frequency domain resource of the second time-frequency resource and that is transmitted by using the port 8.

Case 2: The second antenna port number used by the sending device to send the second data is different from any first antenna port number used by the sending device to send the first data. This case may include the following two implementations:

In a first implementation, when the sending device is a network device and the receiving device is a terminal device, the sending device may send third indication information to the receiving device. The third indication information is used to determine the first antenna port number corresponding to the second antenna port number. Therefore, after receiving the third indication information, the receiving device may use, when the first time-frequency resource and the second time-frequency resource have an overlapped target frequency domain resource in frequency domain, the first DMRS that is mapped to the target frequency domain resource of the first time-frequency resource and that is transmitted by using the first antenna port number indicated by the third indication information and corresponding to the second antenna port number, to demodulate the second data mapped to the target frequency domain resource of the second time-frequency resource.

During specific implementation, the third indication information may indicate the first antenna port number corresponding to the second antenna port number to the receiving device by carrying an identifier of the first antenna port number corresponding to the second antenna port number. Optionally, when there are a plurality of second antenna port numbers, the third indication information may carry an identifier of a first antenna port number corresponding to each of the second antenna port numbers, to indicate the first antenna port number corresponding to each of the second antenna port numbers to the receiving device.

During specific implementation, the sending device may send the third indication information to the receiving device by using higher layer signaling or physical layer signaling, or the sending device may send the third indication information to the receiving device by using downlink control signaling (for example, DCI).

In a second implementation, if a correspondence between the second antenna port number and the first antenna port number is predefined in a protocol, the receiving device may determine, based on an identifier of the second antenna port number and the preset correspondence between the second antenna port number and the first antenna port number, the first antenna port number corresponding to the second antenna port number. Then, the receiving device may use the first DMRS that is mapped to the target frequency domain resource of the first time-frequency resource and that is transmitted by using the first antenna port number corresponding to the second antenna port number, to demodulate the second data mapped to the target frequency domain resource of the second time-frequency resource.

It should be noted that the correspondence between the second antenna port number and the first antenna port number that is predefined in the protocol is not limited in this embodiment. Optionally, it may be predefined in the protocol that second antenna port numbers are in a one-to-one correspondence with first antenna port numbers. A rule of correspondence between the first antenna port number and the second antenna port number may alternatively be defined in the protocol. For example, a rule of correspondence that the second antenna ports correspond to the first antenna ports in ascending order may be predefined in the protocol; or a rule of correspondence that the second antenna ports correspond to the first antenna ports in descending order may be predefined in the protocol.

For example, it is assumed that the first antenna port numbers include a port 7, a port 8, a port 11, and a port 13, and the second antenna port numbers include a port 9, a port 10, a port 12, and a port 14. When the rule of correspondence that the first antenna ports are sequentially used in ascending order is used, the second antenna port number port 9 corresponds to the first antenna port number port 7, the second antenna port number port 10 corresponds to the first antenna port number port 8, the second antenna port number port 12 corresponds to the first antenna port number port 11, and the second antenna port number port 14 corresponds to the first antenna port number port 13. In other words, the receiving device may use a first DMRS that is mapped to the target frequency domain resource of the first time-frequency resource and that is transmitted by using the port 7, to demodulate second data that is mapped to the target frequency domain resource of the second time-frequency resource and that is transmitted by using the port 9; use a first DMRS that is mapped to the target frequency domain resource of the first time-frequency resource and that is transmitted by using the port 8, to demodulate second data that is mapped to the target frequency domain resource of the second time-frequency resource and that is transmitted by using the port 10; use a first DMRS that is mapped to the target frequency domain resource of the first time-frequency resource and that is transmitted by using the port 11, to demodulate second data that is mapped to the target frequency domain resource of the second time-frequency resource and that is transmitted by using the port 12; and use a first DMRS that is mapped to the target frequency domain resource of the first time-frequency resource and that is transmitted by using the port 13, to demodulate second data that is mapped to the target frequency domain resource of the second time-frequency resource and that is transmitted by using the port 14.

For example, it is assumed that the first antenna port numbers include a port 7, a port 8, a port 11, and a port 13, and the second antenna port numbers include a port 9 and a port 10. When the rule of correspondence that the first antenna ports are sequentially used in ascending order is used, the second antenna port number port 9 corresponds to the first antenna port number port 7, and the second antenna port number port 10 corresponds to the first antenna port number port 8. In other words, the receiving device may use a first DMRS that is mapped to the target frequency domain resource of the first time-frequency resource and that is transmitted by using the port 7, to demodulate second data that is mapped to the target frequency domain resource of the second time-frequency resource and that is transmitted by using the port 9; and use a first DMRS that is mapped to the target frequency domain resource of the first time-frequency resource and that is transmitted by using the port 8, to demodulate second data that is mapped to the target frequency domain resource of the second time-frequency resource and that is transmitted by using the port 10.

For example, it is assumed that the first antenna port numbers include a port 7, a port 8, a port 11, and a port 13, and the second antenna port numbers include a port 9, a port 10, a port 12, and a port 14. When the rule of correspondence that the first antenna ports are sequentially used in descending order is used, the second antenna port number port 9 corresponds to the first antenna port number port 13, the second antenna port number port 10 corresponds to the first antenna port number port 11, the second antenna port number port 12 corresponds to the first antenna port number port 8, and the second antenna port number port 14 corresponds to the first antenna port number port 7. In other words, the receiving device may use a first DMRS that is mapped to the target frequency domain resource of the first time-frequency resource and that is transmitted by using the port 7, to demodulate second data that is mapped to the target frequency domain resource of the second time-frequency resource and that is transmitted by using the port 14; use a first DMRS that is mapped to the target frequency domain resource of the first time-frequency resource and that is transmitted by using the port 8, to demodulate second data that is mapped to the target frequency domain resource of the second time-frequency resource and that is transmitted by using the port 12; use a first DMRS that is mapped to the target frequency domain resource of the first time-frequency resource and that is transmitted by using the port 11, to demodulate second data that is mapped to the target frequency domain resource of the second time-frequency resource and that is transmitted by using the port 10; and use a first DMRS that is mapped to the target frequency domain resource of the first time-frequency resource and that is transmitted by using the port 13, to demodulate second data that is mapped to the target frequency domain resource of the second time-frequency resource and that is transmitted by using the port 9.

For example, it is assumed that the first antenna port numbers include a port 7, a port 8, a port 11, and a port 13, and the second antenna port numbers include a port 9 and a port 10. When the rule of correspondence that the first antenna ports are sequentially used in descending order is used, the second antenna port number port 9 corresponds to the first antenna port number port 13, and the second antenna port number port 10 corresponds to the first antenna port number port 11. In other words, the receiving device may use a first DMRS that is mapped to the target frequency domain resource of the first time-frequency resource and that is transmitted by using the port 7, to demodulate second data that is mapped to the target frequency domain resource of the second time-frequency resource and that is transmitted by using the port 14; and use a first DMRS that is mapped to the target frequency domain resource of the first time-frequency resource and that is transmitted by using the port 8, to demodulate second data that is mapped to the target frequency domain resource of the second time-frequency resource and that is transmitted by using the port 12.

Figure 10:
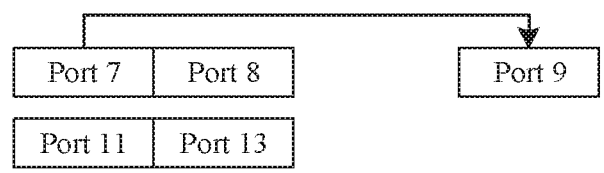
FIG. 10 is a schematic diagram of antenna port numbers according to an embodiment of this application.

FIG. 10 is a schematic diagram of antenna port numbers according to an embodiment of this application. As shown in FIG. 10, for example, a second antenna port number used by a sending device to send second data is a port 9, and first antenna port numbers used by the sending device to send first data include a port 7, a port 8, a port 11, and a port 13. In this scenario, second antenna port number used by the sending device to send the second data is different from any one of the first antenna port numbers used by the sending device to send the first data, and a quantity of second antenna ports is less than a quantity of first antenna ports.

If a correspondence between the second antenna port number and the first antenna port number is predefined in a protocol, the foregoing receiving device may determine, based on the port 9 and the preset correspondence between the second antenna port number and the first antenna port number, a first antenna port number (which is the port 7 in this example) corresponding to the port 9. Then, the receiving device may use a first DMRS that is mapped to a target frequency domain resource of a first time-frequency resource and that is transmitted by using the port 7, to demodulate second data mapped to a target frequency domain resource of a second time-frequency resource.

Optionally, if the sending device is a network device and the receiving device is a terminal device, the sending device may further send, to the receiving device, third indication information carrying an identifier of the port 7. In this way, after receiving the third indication information, the receiving device may determine, based on the identifier of the port 7, that the port 7 is the antenna port number corresponding to the port 9. Therefore, the receiving device may use the first DMRS that is mapped to the target frequency domain resource of the first time-frequency resource and that is transmitted by using the port 7 to demodulate the second data mapped to the target frequency domain resource of the second time-frequency resource.

It should be noted that, when the quantity of second antenna ports used by the sending device to send the second data is different from the quantity of first antenna ports used by the sending device to send the first data, a power at which the sending device sends the first DMRS on the first time-frequency resource is different from a transmit power at which the sending device sends the second data on the second time-frequency resource. Therefore, when the sending device is a network device and the receiving device is a terminal device, the sending device may further send fourth indication information to the receiving device. The fourth indication information is used to indicate a ratio of a transmit power of the first DMRS to a transmit power of the second data. In this way, after receiving the fourth indication information, the receiving device can accurately measure channel estimation of the first DMRS based on the ratio of the transmit power of the first DMRS to the transmit power of the second data, so that the receiving device can accurately perform channel estimation on the second data based on the first DMRS, thereby improving demodulation accuracy of the second data. During specific implementation, the sending device may send the fourth indication information to the receiving device by using higher layer signaling or physical layer signaling, or the sending device may send the fourth indication information to the receiving device by using downlink control signaling (for example, DCI).

In some embodiments, the receiving device may alternatively determine the power ratio of the transmit power of the first DMRS to the transmit power of the second data based on the quantity of first antenna ports and the quantity of second antenna ports. In this way, the receiving device can accurately perform channel estimation on the second data based on the power ratio by using the first DMRS, thereby improving the demodulation accuracy of the second data. For example, if the quantity of first antenna ports is 4, to be specific, the first antenna ports are #7, #8, #9, and #10, and the quantity of second antenna ports is 1, to be specific, the second antenna port is #7, the terminal device determines that the port #7 of the first DMRS is used for the second DMRS. The terminal determines that a power of a DMRS at the port #7 of the first DMRS is ¼, and a power at which the second data is sent by using the second antenna port is 1. Therefore, a ratio of the power of the first DMRS to the power of the second data is ¼. When the terminal demodulates the second data, a channel estimation result of the first DMRS is increased by 4 times during calculation, to demodulate the second data.

According to the data transmission method provided in this embodiment of this application, when the second antenna port number used by the sending device to send the second data is different from any first antenna port number used by the sending device to send the first data, and the quantity of second antenna ports is less than the quantity of first antenna ports, the receiving device may use the first DMRS transmitted by using the first antenna port number corresponding to the second antenna port number to demodulate the second data mapped to the target frequency domain resource of the second time-frequency resource. In this manner, although signaling indication overheads are reduced, the receiving device can still determine a DMRS that is on a first data antenna port number and that is used to demodulate the second data.

In addition, in some embodiments, the sending device may send the first data and the second data by using different subcarrier spacings. Therefore, the sending device may determine a mapping mode of the first DMRS on a frequency domain resource of the first time-frequency resource and a mapping mode of the second DMRS on a frequency domain resource of the second time-frequency resource based on a physical resource block bundling (PRB bundling) configuration or a subband (BP) configuration.

In this way, after receiving the first DMRS, the receiving device may determine a quantity of subcarrier spacings based on which the receiving device measures channel estimation of a DMRS, based on a current numerology configuration (for example, a quantity of numerologies) of a system, or a current subcarrier spacing configuration (for example, a quantity of different subcarrier spacings) of a system, or a quantity of discrete Fourier transform fast algorithm engines (FFT engine) enabled by the receiving device. The first data is demodulated by using a channel estimation result that is of the first DMRS and that is measured based on a numerology of the first data, and the second data is demodulated by using a channel estimation result that is of the first DMRS and that is measured based on a numerology of the second data, so that a numerology used in channel estimation that is of the first DMRS and that is used in data demodulation conforms to the numerology of the data. Channel estimation that is performed on the first DMRS based on a plurality of subcarrier spacings refers to downsampling (subsampling) of the first DMRS. For example, a time-frequency resource pattern of the first DMRS is mapped to each RB, and a pattern of the first DMRS is extracted at an interval of an RB, so that channel estimation in one time of a subcarrier spacing can be implemented. For example, a pattern of the first DMRS used when the subcarrier spacing is 30 kHz may be obtained by using this method and based on a pattern of the first DMRS used when the subcarrier spacing is 15 kHz. In this way, the receiving device may accurately perform channel estimation on the first data and the second data, thereby improving data demodulation accuracy. During specific implementation, the sending device may indicate a current numerology configuration or subcarrier spacing configuration of a system to the receiving device by using one piece of indication information. Optionally, the indication information may be sent to the receiving device by using higher layer signaling or physical layer signaling.

Figure 11:
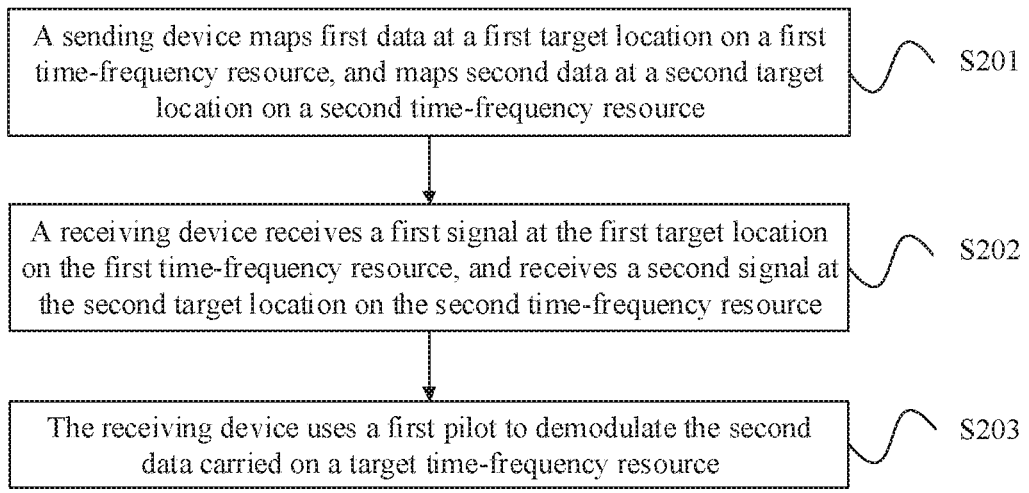
FIG. 11 is a schematic flowchart of another data transmission method according to an embodiment of this application.

FIG. 11 is a schematic flowchart of another data transmission method according to an embodiment of this application. As shown in FIG. 11, the method may include the following steps.

S201. A sending device maps first data at a first target location on a first time-frequency resource, and maps second data at a second target location on a second time-frequency resource.

The first target location does not include a time-frequency resource location of a first pilot and a target time-frequency resource. The second target location does not include a time-frequency resource location of a second pilot. The time-frequency resource location of the second pilot does not include the target time-frequency resource. The target time-frequency resource is an overlapped time-frequency resource between the first time-frequency resource and the second time-frequency resource.

The first pilot and the second pilot may be terminal device-specific (UE-specific) demodulation reference signals, or may be demodulation reference signals of a group in which the terminal device is located (UE group-specific). For example, the demodulation reference signal may be a DMRS. In this embodiment, the first pilot is mapped to a time-frequency resource that is on the first time-frequency resource and that is specially used to map the first pilot, and the second pilot is mapped to a time-frequency resource that is other than the target time-frequency resource on the second time-frequency resource and that is specially used to map the first pilot.

Figure 12:
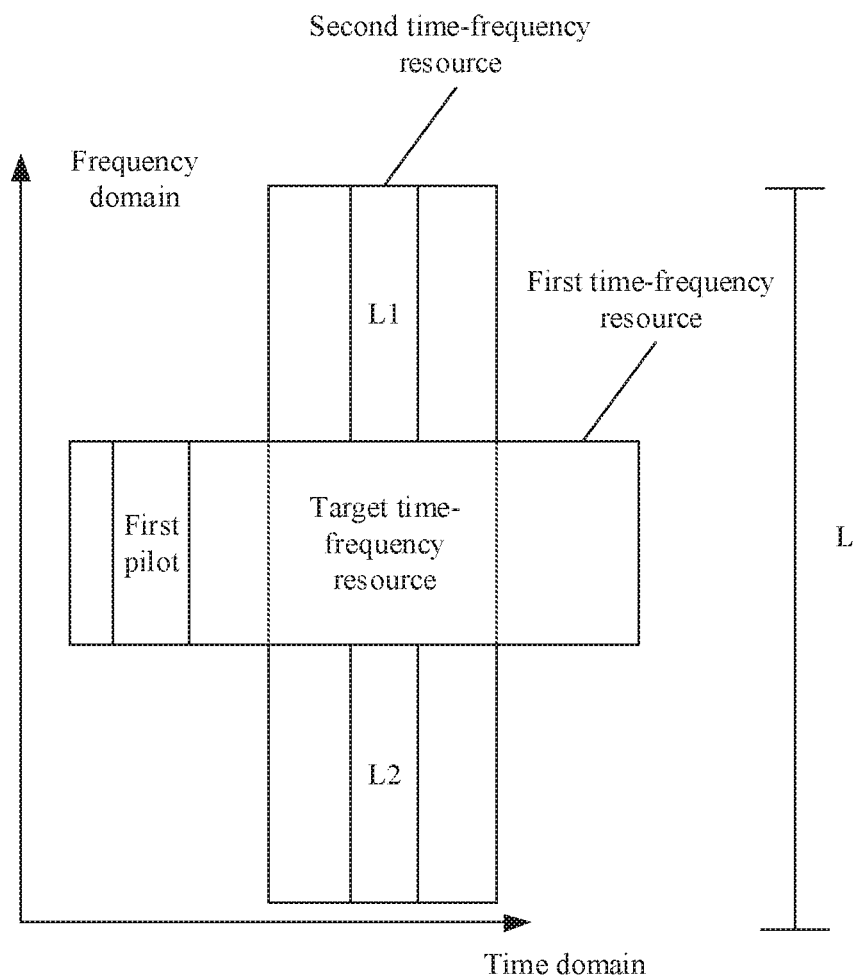
FIG. 12 is a schematic diagram of still another time-frequency resource according to an embodiment of this application.

The first data is mapped to the first time-frequency resource except the time-frequency resource of the first pilot and the target time-frequency resource, and the second data is mapped to the second time-frequency resource except the time-frequency resource of the second pilot. The target time-frequency resource is an overlapped time-frequency resource of the first time-frequency resource and the second time-frequency resource. A frequency domain bandwidth of the target time-frequency resource may be less than a frequency domain bandwidth of the second time-frequency resource. Alternatively, a bandwidth of the target time-frequency resource may be equal to a frequency domain bandwidth of the second time-frequency resource, FIG. 12 is a schematic diagram of still another time-frequency resource according to an embodiment of this application. As shown in FIG. 12, a sequence of the second pilot may be generated based on a frequency domain width L of the second time-frequency resource, then is truncated to lengths L1 and L2, and is mapped to non-target time-frequency resource locations separately on the second time-frequency resource. Alternatively, a sequence of the second pilot mapped at a non-target time-frequency resource location is separately generated according to lengths L1 and L2.

As shown in FIG. 12, the first target location mentioned above is all time-frequency resources on the first time-frequency resource except the time-frequency resource on which the first pilot is located and the target time-frequency resource, and the second target location mentioned above is all time-frequency resources on the second time-frequency resource except the time-frequency resources on which L1 and L2 are located.

A manner in which the sending device maps the second data on the second time-frequency resource is not limited in this embodiment. For example, the sending device may first determine available resource elements (RE) used to map the second data. The available REs may include the time-frequency resource, which is originally used to map the second pilot, on the target time-frequency resource of the second time-frequency resource. Subsequently, the sending device may perform mapping on the available REs according to an RE mapping rule of a layer first, then a time domain, and finally a frequency domain, or a layer first, then a frequency domain, and finally a time domain, or a time domain first, then a frequency domain, and finally a layer, or a frequency domain first, then a time domain, and finally a layer.

Alternatively, the sending device may first determine a first available RE used to map the second data. The first available RE does not include the time-frequency resource, which is originally used to map the second pilot, on the target time-frequency resource of the second time-frequency resource. Subsequently, the sending device may perform mapping on the first available RE according to an RE mapping rule of a layer first, then a time domain, and finally a frequency domain, or a layer first, then a frequency domain, and finally a time domain, or a time domain first, then a frequency domain, and finally a layer, or a frequency domain first, then a time domain, and finally a layer. Then, the sending device performs, according to the RE mapping rule of a layer first, then a time domain, and finally a frequency domain, or a layer first, then a frequency domain, and finally a time domain, or a time domain first, then a frequency domain, and finally a layer, or a frequency domain first, then a time domain, and finally a layer, mapping on the time-frequency resource, which is originally used to map the second pilot, on the target time-frequency resource of the second time-frequency resource.

S202. The receiving device receives a first signal at the first target location on the first time-frequency resource, and receives a second signal at the second target location on the second time-frequency resource.

The first signal includes the first pilot and the first data, and the second signal includes the second data.

S203. The receiving device uses the first pilot to demodulate the second data carried on the target time-frequency resource.

For a manner in which the receiving device demodulates, by using the first pilot, the second data carried on the target time-frequency resource, refer to the description in the foregoing embodiment. Details are not described herein again.

It should be noted that, when an antenna port that is originally used by the receiving device to receive the second pilot on the target frequency domain resource is the same as a part of antenna ports used to receive the first pilot, a precoding weight of the second pilot of the receiving device on the target frequency domain resource is the same as a precoding weight of the part of same antenna ports of the first pilot. In this scenario, PRB bundling of the pilot used by the receiving device to demodulate the second data is the same as PRB bundling of the first pilot. Therefore, when a second antenna port number is the same as a part of antenna port numbers of the first antenna port, the receiving device may assume that the precoding weight of the second antenna port is the same as the precoding weight of the part of same antenna ports of the first antenna port, or the receiving device may assume that the PRB bundling of the pilot used to demodulate the second data is the same as the PRB bundling of the first pilot, and so on.

According to the data transmission method provided in this embodiment of this application, when the sending device needs to send the first data and the second data to the receiving device separately, the sending device may send, when the first time-frequency resource and the second time-frequency resource have an overlapped target time-frequency resource, the second data to the receiving device at the location, which is originally used to send the second DMRS, on the target frequency domain resource of the second time-frequency resource. In this manner, DMRS overheads can be reduced and utilization of resources can be improved. If a service with relatively low reliability uses a DMRS of a service with relatively high reliability, data demodulation accuracy of the service with relatively low reliability may be improved, and a data rate of a service that does not send a DMRS may be improved. If a service with relatively high reliability uses a DMRS of a service with relatively low reliability, a data rate of a service that does not send a DMRS may be improved.

Figure 13:
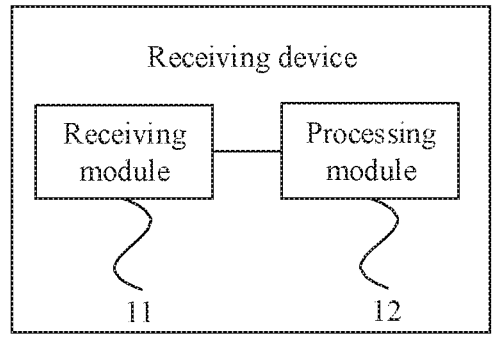
FIG. 13 is a schematic structural diagram of a receiving device according to an embodiment of this application.

FIG. 13 is a schematic structural diagram of a receiving device according to an embodiment of this application. As shown in FIG. 13, the receiving device may include a receiving module 11 and a processing module 12.

The receiving module 11 is configured to: receive first data on a first time-frequency resource, and receive second data on a second time-frequency resource.

The processing module 12 is configured to: when the first time-frequency resource and the second time-frequency resource have an overlapped target frequency domain resource in frequency domain, use a first DMRS mapped to a target frequency domain resource of the first time-frequency resource to demodulate the second data mapped to a target frequency domain resource of the second time-frequency resource.

Optionally, in some embodiments, when the receiving device is a terminal device, the receiving module 11 is further configured to receive first indication information sent by a network device, where the first indication information is used to indicate that the receiving device uses the first DMRS to demodulate the second data mapped to the target frequency domain resource of the second time-frequency resource.

Optionally, in some embodiments, the processing module 12 is specifically configured to: when a spacing and a preset spacing satisfy a mapping relationship, and the first time-frequency resource and the second time-frequency resource have an overlapped target frequency domain resource in frequency domain, use the first DMRS to demodulate the second data mapped to the target frequency domain resource of the second time-frequency resource, where the spacing is a spacing between the first time-frequency resource and the second time-frequency resource. Optionally, when the receiving device is a terminal device, the receiving module 11 is further configured to receive second indication information sent by the network device, where the second indication information is used to indicate the preset spacing. Optionally, the preset spacing and a moving speed of the terminal device and a channel time variant parameter of the terminal device satisfy a mapping relationship.

Optionally, in some embodiments, the processing module 12 is specifically configured to: when first antenna port information is the same as second antenna port information, and the first time-frequency resource and the second time-frequency resource have an overlapped target frequency domain resource in frequency domain, use the first DMRS to demodulate the second data mapped to the target frequency domain resource of the second time-frequency resource, where the first antenna port information is antenna port information used by the sending device to send the first data, and the second antenna port information is antenna port information used by the sending device to send the second data; and the first antenna port information includes a quantity of first antenna ports used by the sending device to send the first data and/or at least one first antenna port number, and the second antenna port information includes a quantity of second antenna ports used by the sending device to send the second data and/or at least one second antenna port number.

Optionally, in some embodiments, when the receiving device is a terminal device, the receiving module 11 is further configured to receive third indication information sent by the network device, where the third indication information is used to determine a first antenna port number corresponding to the second antenna port number; and the processing module 12 is specifically configured to use the first DMRS transmitted by using the first antenna port number corresponding to the second antenna port number to demodulate the second data mapped to the target frequency domain resource of the second time-frequency resource. For example, the third indication information may include an identifier of the first antenna port number corresponding to the second antenna port number.

Optionally, in some embodiments, the processing module 12 is specifically configured to: determine, based on an identifier of the second antenna port number and a preset correspondence between the second antenna port number and the first antenna port number, the first antenna port number corresponding to the second antenna port number, and use the first DMRS transmitted by using the first antenna port number corresponding to the second antenna port number to demodulate the second data mapped to the target frequency domain resource of the second time-frequency resource.

Optionally, in some embodiments, when the receiving device is a terminal device, the receiving module 11 is further configured to receive fourth indication information sent by the network device, where the fourth indication information is used to indicate a ratio of a transmit power of the first DMRS to a transmit power of the second data.

It should be noted that, when the receiving device is a terminal device, the sending device may be a network device. When the receiving device is a network device, the sending device is a terminal device. Optionally, the receiving device may alternatively be a chip.

The receiving device provided in this embodiment of this application may perform the actions of the receiving device in the foregoing method embodiments. Implementation principles and technical effects thereof are similar. Details are not described herein again.

Figure 14:
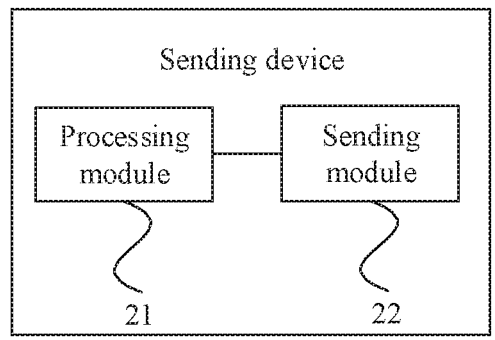
FIG. 14 is a schematic structural diagram of a sending device according to an embodiment of this application.

FIG. 14 is a schematic structural diagram of a sending device according to an embodiment of this application. As shown in FIG. 14, the sending device may include a processing module 21 and a sending module 22.

The processing module 21 is configured to determine a first time-frequency resource on which first data is sent and a second time-frequency resource on which second data is sent.

The processing module 21 is further configured to: when the first time-frequency resource and the second time-frequency resource have an overlapped target frequency domain resource, instruct the sending module 22 to send the second data on a target frequency domain resource of the second time-frequency resource.

Optionally, in some embodiments, when the sending device is a network device, the sending module 22 is further configured to send first indication information to a terminal device, where the first indication information is used to indicate that the terminal device uses a first DMRS mapped to a target frequency domain resource of the first time-frequency resource to demodulate the second data mapped to the target frequency domain resource of the second time-frequency resource.

Optionally, in some embodiments, the processing module 21 is specifically configured to: when a spacing and a preset spacing satisfy a mapping relationship, and the first time-frequency resource and the second time-frequency resource have an overlapped target frequency domain resource, instruct the sending module 22 to send the second data on the target frequency domain resource of the second time-frequency resource, where the spacing is a spacing between the first time-frequency resource and the second time-frequency resource. Optionally, when the sending device is a network device, the sending module 22 is further configured to send second indication information to the terminal device, where the second indication information is used to indicate the preset spacing. Optionally, the preset spacing and a moving speed of the terminal device and a channel time variant parameter of the terminal device satisfy a mapping relationship.

Optionally, in some embodiments, the processing module 21 is specifically configured to: when first antenna port information is the same as second antenna port information, and the first time-frequency resource and the second time-frequency resource have an overlapped target frequency domain resource, instruct the sending module to send the second data on the target frequency domain resource of the second time-frequency resource, where the first antenna port information is antenna port information used by the sending device to send the first data, and the second antenna port information is antenna port information used by the sending device to send the second data; and the first antenna port information includes a quantity of first antenna ports used by the sending device to send the first data and/or at least one first antenna port number, and the second antenna port information includes a quantity of second antenna ports used by the sending device to send the second data and/or at least one second antenna port number.

Optionally, in some embodiments, when the sending device is a network device, the sending module 22 is further configured to send third indication information to the terminal device, where the third indication information is used to determine a first antenna port number corresponding to the second antenna port number. For example, the third indication information includes an identifier of the first antenna port number corresponding to the second antenna port number.

Optionally, in some embodiments, when the sending device is a network device, the sending module 22 is further configured to send fourth indication information to the terminal device, where the fourth indication information is used to indicate a ratio of a transmit power of the first DMRS to a transmit power of the second data.

It should be noted that, when the sending device is a terminal device, the receiving device may be a network device. When the sending device is a network device, the receiving device is a terminal device. Optionally, the sending device may alternatively be a chip.

The sending device provided in this embodiment of this application may perform the actions of the sending device in the foregoing method embodiments. Implementation principles and technical effects thereof are similar. Details are not described herein again.

Another aspect of the embodiments of this application further provides a sending device, and the sending device may include a processing module. The processing module is configured to: map first data at a first target location on a first time-frequency resource, and map second data at a second target location on a second time-frequency resource, where the first target location does not include a time-frequency resource location of a first pilot and a target time-frequency resource, the target time-frequency resource is an overlapped time-frequency resource of the first time-frequency resource and the second time-frequency resource, the second target location does not include a time-frequency resource location of a second pilot, and the time-frequency resource location of the second pilot does not include the target time-frequency resource.

It should be noted that the sending device may be a terminal device or a network device. Optionally, the sending device may alternatively be a chip.

The sending device provided in this embodiment of this application may perform the actions of the sending device in the foregoing method embodiments. Implementation principles and technical effects thereof are similar. Details are not described herein again.

Figure 15:
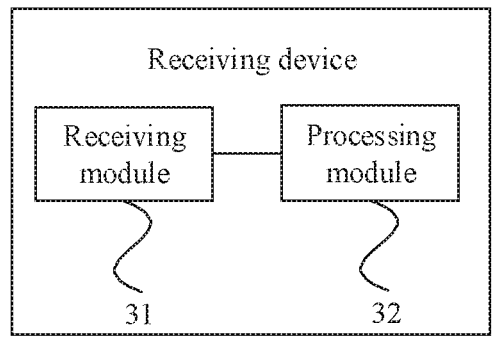
FIG. 15 is a schematic structural diagram of another receiving device according to an embodiment of this application.

FIG. 15 is a schematic structural diagram of another receiving device according to an embodiment of this application. As shown in FIG. 15, the receiving device may include a receiving module 31 and a processing module 32.

The receiving module 31 is configured to receive a first signal on a time-frequency resource, other than a target time-frequency resource, of a first time-frequency resource, and receive a second signal on a second time-frequency resource, where a first target location does not include a time-frequency resource location of a first pilot and the target time-frequency resource, the target time-frequency resource is an overlapped time-frequency resource of the first time-frequency resource and the second time-frequency resource, a second target location does not include a time-frequency resource location of a second pilot, the time-frequency resource location of the second pilot does not include the target time-frequency resource, the first signal includes the first pilot and first data, and the second signal includes second data.

The processing module 32 is configured to use the first pilot to demodulate the second data carried on the target time-frequency resource.

It should be noted that the receiving device may be a terminal device or a network device. Optionally, the receiving device may alternatively be a chip.

The receiving device provided in this embodiment of this application may perform the actions of the receiving device in the foregoing method embodiments. Implementation principles and technical effects thereof are similar. Details are not described herein again.

It should be noted that the sending module may be a transmitter during actual implementation, the receiving module may be a receiver during actual implementation, and the processing module may be implemented in a form of software invoked by a processing element, or may be implemented in a form of hardware. For example, the processing module may be an independently disposed processing element, or may be integrated into a chip of the foregoing apparatus for implementation. In addition, the processing module may be stored in a memory of the foregoing apparatus in a form of program code, and invoked by a processing element of the foregoing sending device or the foregoing receiving device to perform the functions of the processing module. In addition, all or some of the modules may be integrated together, or may be separately implemented. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing methods, for example, one or more application-specific integrated circuits (ASIC), one or more microprocessors (DSP), or one or more field programmable gate arrays (FPGA). For another example, when a module is implemented in a form of scheduling program code by a processing element, the processing element may be a general purpose processor, for example, a central processing unit (CPU for short) or another processor that may invoke the program code. For another example, these modules may be integrated and implemented in a form of a system-on-a-chip (SOC for short).

Figure 16:
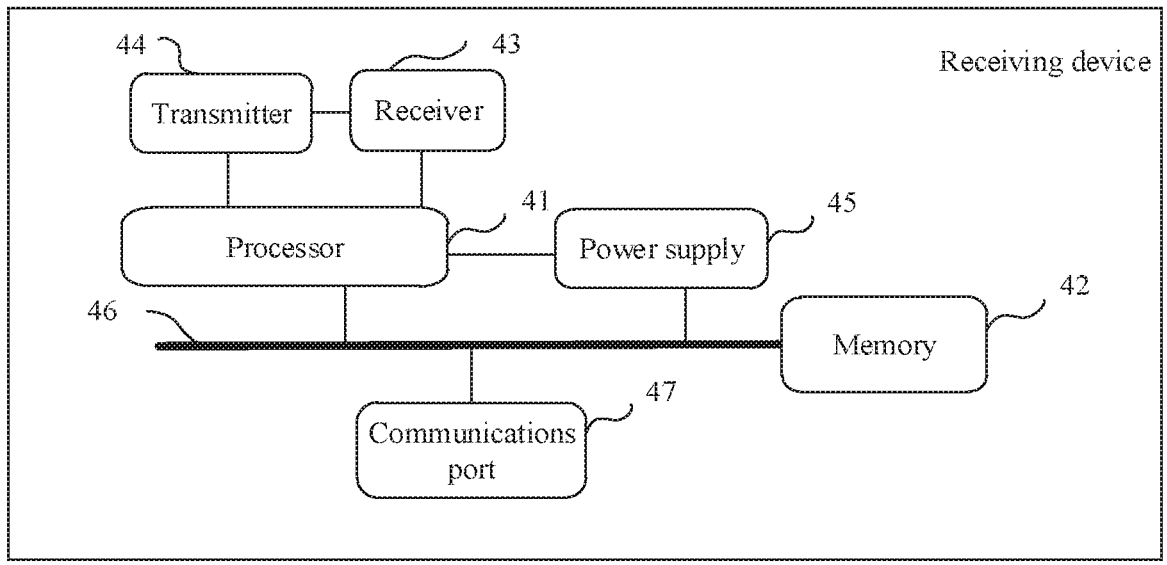
FIG. 16 is a schematic structural diagram of still another receiving device according to an embodiment of this application.

FIG. 16 is a schematic structural diagram of still another receiving device according to an embodiment of this application. As shown in FIG. 16, the receiving device may include: a processor 41 (for example, a CPU), a memory 42, and a receiver 43. The receiver 43 is coupled to the processor 41, and the processor 41 controls a receiving action of the receiver 43. The memory 42 may include a high speed RAM memory, or may further include a non-volatile memory NVM, for example, at least one magnetic disk memory. The memory 42 may store various instructions, to implement various processing functions and method steps in this embodiment of this application. Optionally, the receiving device in this embodiment of this application may further include a transmitter 44, a power supply 45, a communications bus 46, and a communications port 47. The receiver 43 and the transmitter 44 may be integrated into a transceiver of the receiving device, or may be independent transceiver antennas of the receiving device. The communications bus 46 is configured to implement communication and connection between elements. The communications port 47 is configured to implement connection and communication between the receiving device and another peripheral.

In this embodiment of this application, the memory 42 is configured to store computer-executable program code, where the program code includes an instruction. When the processor 41 executes the instruction, the instruction enables the processor 41 to perform a processing action in the foregoing method embodiments, and enables the receiver to perform a receiving action in the foregoing method embodiments. Implementation principles and technical effects thereof are similar. Details are not described herein again.

It should be noted that, when the receiving device is a terminal device, the sending device may be a network device. When the receiving device is a network device, the sending device is a terminal device.

Figure 17:
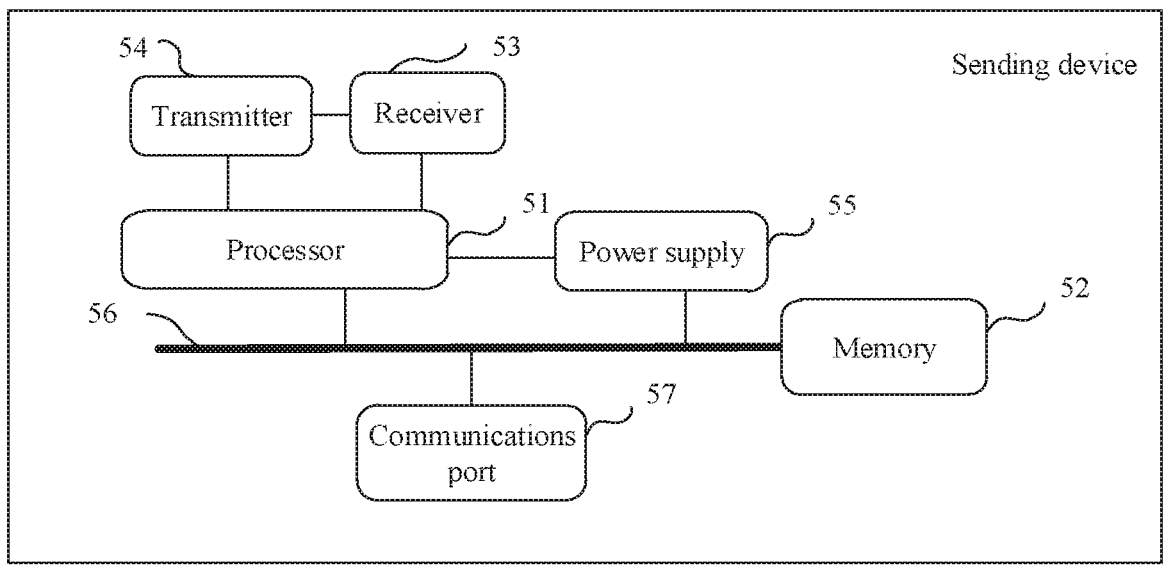
FIG. 17 is a schematic structural diagram of another sending device according to an embodiment of this application.

FIG. 17 is a schematic structural diagram of another sending device according to an embodiment of this application. As shown in FIG. 17, the sending device may include a processor 51 (for example, a CPU), a memory 52, and a transmitter 54. The transmitter 54 is coupled to the processor 51, and the processor 51 controls a sending action of the transmitter 54. The memory 52 may include a high speed RAM memory, or may further include a non-volatile memory NVM, for example, at least one magnetic disk memory. The memory 52 may store various instructions, to implement various processing functions and method steps in this embodiment of this application. Optionally, the sending device in this embodiment of this application may further include a receiver 53, a power supply 55 a communications bus 56, and a communications port 57. The receiver 53 and the transmitter 54 may be integrated into a transceiver of the sending device, or may be independent transceiver antennas of the sending device. The communications bus 56 is configured to implement communication and connection between elements. The communications port 57 is configured to implement connection and communication between the sending device and another peripheral.

In this embodiment of this application, the memory 52 is configured to store computer-executable program code, where the program code includes an instruction. When the processor 51 executes the instruction, the instruction enables the processor 51 to perform a processing action in the foregoing method embodiments, and enables the transmitter to perform a sending action in the foregoing method embodiments. Implementation principles and technical effects thereof are similar. Details are not described herein again.

It should be noted that, when the sending device is a terminal device, the receiving device may be a network device. When the sending device is a network device, the receiving device is a terminal device.

Figure 18:
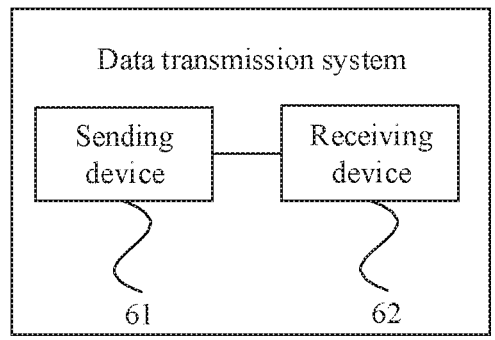
FIG. 18 is a schematic structural diagram of a data transmission system according to an embodiment of this application.

FIG. 18 is a schematic structural diagram of a data transmission system according to an embodiment of this application. As shown in FIG. 18, the system includes a sending device 61 and a receiving device 62.

The sending device 61 is configured to: map first data at a first target location on a first time-frequency resource, and map second data at a second target location on a second time-frequency resource, where the first target location does not include a time-frequency resource location of a first pilot and a target time-frequency resource, the target time-frequency resource is an overlapped time-frequency resource of the first time-frequency resource and the second time-frequency resource, the second target location does not include a time-frequency resource location of a second pilot, and the time-frequency resource location of the second pilot does not include the target time-frequency resource.

The receiving device 62 is configured to: receive a first signal on a time-frequency resource, other than the target time-frequency resource, of the first time-frequency resource, and receive a second signal on the second time-frequency resource, where the first signal includes the first pilot and the first data, and the second signal includes the second data.

The receiving device 62 is further configured to use the first pilot to demodulate the second data carried on the target time-frequency resource.

The sending device in the data transmission system provided in this embodiment of this application may perform the actions of the sending device in the foregoing method embodiments. The receiving device in the data transmission system may perform the actions of the receiving device in the foregoing method embodiments. Implementation principles and technical effects thereof are similar. Details are not described herein again.

Figure 19:
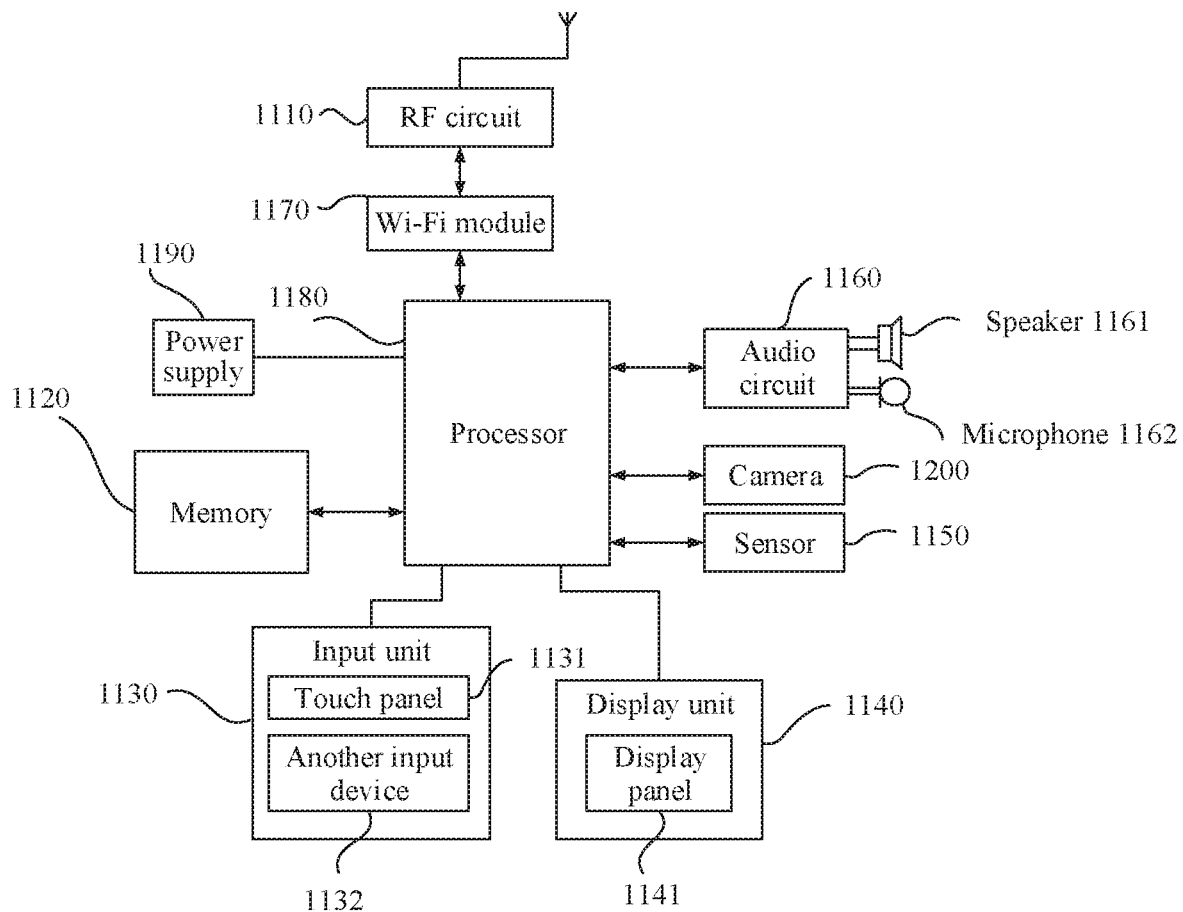
FIG. 19 is a structural block diagram of a terminal device being a mobile phone according to an embodiment of this application.

As described in the foregoing embodiments, the terminal device in the embodiments of this application may be a wireless terminal such as a mobile phone or a tablet computer. An example in which the terminal device is a mobile phone is used. FIG. 19 is a structural block diagram of a terminal device being a mobile phone according to an embodiment of this application. Referring to FIG. 19, the mobile phone may include components such as a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190. A person skilled in the art may understand that the mobile phone structure shown in FIG. 19 constitutes no limitation on the mobile phone, and the mobile phone may include more or fewer components than those shown in the figure, or some components may be combined, or a different component arrangement may be used.

The following describes the components of the mobile phone in detail with reference to FIG. 19.

The RF circuit 1110 may be configured to send and receive signals in an information sending and receiving process or a call process. For example, after receiving downlink information from a base station, the RF circuit 1110 sends the downlink information to the processor 1180 for processing, and sends uplink data to the base station. Usually, the RF circuit includes, but is not limited to, an antenna, at least one amplifier, a transceiver, a coupler, a low noise amplifier (LNA), a duplexer, and the like. In addition, the RF circuit 1110 may further communicate with a network and another device through wireless communication. Any communication standard or protocol may be used in the wireless communication, including but not limited to global system for mobile communications (GSM), a general packet radio service (GPRS), code division multiple access (CDMA), wideband code division multiple access (WCDMA), long term evolution (LIE), an email, a short message service (SMS), and the like.

The memory 1120 may be configured to store a software program and module. The processor 1180 executes various function applications of the mobile phone and data processing by running the software program and module that are stored in the memory 1120. The memory 1120 may mainly include a program storage area and a data storage area. The program storage area may store an operating system, an application required by at least one function (such as a voice playing function and an image playing function), and the like. The data storage area may store data (such as audio data and a phone book) that is created based on use of the mobile phone, and the like. In addition, the memory 1120 may include a high speed random access memory, and may further include a nonvolatile memory such as at least one magnetic disk storage component, a flash memory, or another volatile solid-state storage component.

The input unit 1130 may be configured to: receive input digit or character information, and generate a key signal input related to a user setting and function control of the mobile phone. Specifically, the input unit 1130 may include a touch panel 1131 and another input device 1132. The touch panel 1131, also referred to as a touchscreen, can collect a touch operation performed by a user on or near the touch panel 1131 (for example, an operation performed by the user on or near the touch panel 1131 by using any proper object or accessory such as a finger or a stylus), and can drive a corresponding connection apparatus based on a preset program. Optionally, the touch panel 1131 may include two parts: a touch detection apparatus and a touch controller. The touch detecting apparatus detects a touch direction of the user, detects a signal brought by the touch operation, and transfers the signal to the touch controller; and the touch controller receives touch information from the touch detecting apparatus, converts the touch information into coordinates of a touch point, sends the coordinates to the processor 1180, and can receive and execute a command sent by the processor 1180. In addition, the touch panel 1131 may be implemented in a plurality of types such as a resistive type, a capacitive type, an infrared type, and a surface acoustic wave type. In addition to the touch panel 1131, the input unit 1130 may further include the another input device 1132. Specifically, the another input device 1132 may include, but is not limited to, one or more of a physical keyboard, a function key (for example, a volume control key or an on/off key), a trackball, a mouse, a joystick, or the like.

The display unit 1140 may be configured to display information entered by the user or information provided for the user, and various menus of the mobile phone. The display unit 1140 may include a display panel 1141. Optionally, a form such as a liquid crystal display (LCD) or an organic light-emitting diode (OLED) may be used to configure the display panel 1141. Further, the touch panel 1131 may cover the display panel 1141. When detecting a touch operation on or near the touch panel 1131, the touch panel 1131 transfers the touch operation to the processor 1180 to determine a type of a touch event, and then the processor 1180 provides corresponding visual output on the display panel 1141 based on the type of the touch event. In FIG. 19, the touch panel 1131 and the display panel 1141 are used as two independent components to implement input and output functions of the mobile phone. However, in some embodiments, the touch panel 1131 and the display panel 1141 may be integrated to implement the input and output functions of the mobile phone.

The mobile phone may further include at least one sensor 1150, such as an optic sensor, a motion sensor, and another sensor. Specifically, the optic sensor may include an ambient light sensor and a proximity sensor. The ambient light sensor may adjust luminance of the display panel 1141 based on brightness of ambient light, and when the mobile phone approaches an ear, the optic sensor may turn off the display panel 1141 and/or backlight. As a type of motion sensor, an acceleration sensor may detect values of acceleration in various directions (usually three axes), may detect, in a static state, a value and a direction of gravity, and may be used for an application that identifies a posture (such as screen switching between a landscape mode and a portrait mode, a related game, and magnetometer posture calibration) of the mobile phone, a vibration-identification-related function (such as a pedometer and tapping), and the like. Other sensors that can be configured on the mobile phone such as a gyroscope, a barometer, a hygrometer, a thermometer, and an infrared sensor are not described herein.

The audio circuit 1160, a speaker 1161, and a microphone 1162 may provide an audio interface between the user and the mobile phone. The audio circuit 1160 may transmit, to the speaker 1161, an electrical signal that is obtained after conversion of received audio data, and the speaker 1161 converts the electrical signal into an acoustic signal and outputs the acoustic signal. In addition, the microphone 1162 converts a collected acoustic signal into an electrical signal, the audio circuit 1160 receives the electrical signal and converts the electrical signal into audio data, and outputs the audio data to the processor 1180 for processing, and then processed audio data is sent to, for example, another mobile phone, by using the RF circuit 1110, or the audio data is output to the memory 1120 for further processing.

Wi-Fi belongs to a short-distance wireless transmission technology. The mobile phone may help, by using the Wi-Fi module 1170, the user send and receive an email, browse a web page, access streaming media, and so on. The Wi-Fi module 1170 provides wireless broadband interact access for the user. Although the Wi-Fi module 1170 is shown in FIG. 19, it should be understood that the Wi-Fi module 1170 is not a necessary component of the mobile phone, and may be omitted based on a requirement without changing the essence of this embodiment of this application.

The processor 1180 is a control center of the mobile phone, connects each part of the entire mobile phone by using various interfaces and lines, and executes various functions and processes data of the mobile phone by running or executing the software program and/or module stored in the memory 1120 and invoking data stored in the memory 1120, to perform overall monitoring on the mobile phone. Optionally, the processor 1180 may include one or more processing units. For example, an application processor and a modem processor may be integrated into the processor 1180, where the application processor mainly processes an operating system, a user interface, an application program, and the like, and the modem processor mainly processes wireless communication. It can be understood that the modem processor may alternatively not be integrated into the processor 1180.

The mobile phone further includes the power supply 1190 (such as a battery) that supplies power to each component. Optionally, the power supply may be logically connected to the processor 1180 by using a power management system, so that functions such as management of charging, discharging, and power consumption are implemented by using the power management system.

The mobile phone may further include a camera 1200. The camera may be a front-facing camera or a rear-facing camera. Although not shown, the mobile phone may further include, for example, a Bluetooth module and a GPS module. Details are not described herein.

In this embodiment of this application, the processor 1180 included in the mobile phone may be configured to perform the foregoing data transmission method embodiments. Implementation principles and technical effects thereof are similar. Details are not described herein again.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are ail or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A data transmission method, comprising:
receiving, by a receiving device, first data on a first time-frequency resource, and receiving second data on a second time-frequency resource; and
when (i) the first time-frequency resource and the second time-frequency resource have an overlapped target frequency domain resource in frequency domain and (ii) a spacing between the first time-frequency resource and the second time-frequency resource satisfies a preset spacing, using, by the receiving device, a first demodulation reference signal (DMRS) mapped to a target frequency domain resource of the first time-frequency resource to demodulate the second data mapped to a target frequency domain resource of the second time-frequency resource, wherein the method comprises at least one of:
receiving, by the receiving device, first indication information sent by a network device, wherein the first indication information is used to indicate the preset spacing, wherein the receiving device is a terminal device; or determining the preset spacing based on a mapping relationship, wherein the preset spacing, a moving speed of a terminal device, and a channel time variant parameter of the terminal device satisfy the mapping relationship.

2. The method according to claim 1, wherein the receiving device is a terminal device, and wherein the method further comprises:
receiving, by the receiving device, second indication information sent by the network device, wherein the second indication information is used to indicate that the receiving device uses the first DMRS to demodulate the second data mapped to the target frequency domain resource of the second time-frequency resource.

3. The method according to claim 1, wherein the using, by the receiving device, a first DMRS to demodulate the second data mapped to a target frequency domain resource of the second time-frequency resource comprises:
when first antenna port information is the same as second antenna port information, and when the first time-frequency resource and the second time-frequency resource have the overlapped target frequency domain resource in the frequency domain, using, by the receiving device, the first DMRS to demodulate the second data mapped to the target frequency domain resource of the second time-frequency resource, wherein:
the first antenna port information is antenna port information used by a sending device to send the first data, and wherein the second antenna port information is antenna port information used by the sending device to send the second data; and
the first antenna port information comprises a quantity of first antenna ports used by the sending device to send at least one of the first data or at least one first antenna port number, and wherein the second antenna port information comprises a quantity of second antenna ports used by the sending device to send at least one of the second data or at least one second antenna port number.

4. The method according to claim 1, wherein the receiving device is a terminal device, and wherein the method further comprises:
receiving, by the receiving device, third indication information sent by the network device, wherein the third indication information is used to determine a first antenna port number corresponding to a second antenna port number; and
wherein the using, by the receiving device, a first DMRS to demodulate the second data mapped to a target frequency domain resource of the second time-frequency resource comprises:
using, by the receiving device, the first DMRS transmitted by using the first antenna port number corresponding to the second antenna port number to demodulate the second data mapped to the target frequency domain resource of the second time-frequency resource.

5. The method according to claim 4, wherein the third indication information comprises an identifier of the first antenna port number corresponding to the second antenna port number.

6. The method according to claim 1, wherein the using, by the receiving device, a first DMRS to demodulate the second data mapped to a target frequency domain resource of the second time-frequency resource comprises:
determining, by the receiving device based on an identifier of a second antenna port number and a preset correspondence between the second antenna port number and a first antenna port number, the first antenna port number corresponding to the second antenna port number; and
using, by the receiving device, the first DMRS transmitted by using the first antenna port number corresponding to the second antenna port number to demodulate the second data mapped to the target frequency domain resource of the second time-frequency resource.

7. The method according to claim 1, wherein the receiving device is a terminal device, and wherein the method further comprises:
receiving, by the receiving device, fourth indication information sent by the network device, wherein the fourth indication information is used to indicate a ratio of a transmit power of the first DMRS to a transmit power of the second data.

8. A receiving device, comprising:
at least one processor; and
a non-transitory computer-readable storage medium coupled to the at least one processor and storing programming instructions for execution by the at least one processor, the programming instructions instruct the at least one processor to:
receive first data on a first time-frequency resource, and receive second data on a second time-frequency resource; and
when (i) the first time-frequency resource and the second time-frequency resource have an overlapped target frequency domain resource in frequency domain and (ii) a spacing between the first time-frequency resource and the second time-frequency resource satisfies a preset spacing, use a first demodulation reference signal (DMRS) mapped to a target frequency domain resource of the first time-frequency resource to demodulate the second data mapped to a target frequency domain resource of the second time-frequency resource, wherein the programming instructions instruct the at least one processor to perform at least one of:
receiving first indication information sent by a network device, wherein the first indication information is used to indicate the preset spacing, wherein the receiving device is a terminal device; or
determining the preset spacing based on a mapping relationship, wherein the preset spacing, a moving speed of a terminal device, and a channel time variant parameter of the terminal device satisfy the mapping relationship.

9. The device according to claim 8, wherein the receiving device is a terminal device, and wherein the programming instructions instruct the at least one processor to:
receive second indication information sent by the network device, wherein the second indication information is used to indicate that the receiving device uses the first DMRS to demodulate the second data mapped to the target frequency domain resource of the second time-frequency resource.

10. The device according to claim 8, wherein the programming instructions instruct the at least one processor to:
when first antenna port information is the same as second antenna port information, and when the first time-frequency resource and the second time-frequency resource have the overlapped target frequency domain resource in the frequency domain, use the first DMRS to demodulate the second data mapped to the target frequency domain resource of the second time-frequency resource, wherein:

the first antenna port information is antenna port information used by a sending device to send the first data, and wherein the second antenna port information is antenna port information used by the sending device to send the second data; and the first antenna port information comprises a quantity of first antenna ports used by the sending device to send at least one of the first data or at least one first antenna port number, and wherein the second antenna port information comprises a quantity of second antenna ports used by the sending device to send at least one of the second data or at least one second antenna port number.

11. The device according to claim 8, wherein the receiving device is a terminal device, and wherein the programming instructions instruct the at least one processor to:

receive third indication information sent by the network device, wherein the third indication information is used to determine a first antenna port number corresponding to a second antenna port number; and use the first DMRS transmitted by using the first antenna port number corresponding to the second antenna port number to demodulate the second data mapped to the target frequency domain resource of the second time-frequency resource.

12. The device according to claim 11, wherein the third indication information comprises an identifier of the first antenna port number corresponding to the second antenna port number.

13. The device according to claim 8, wherein the programming instructions instruct the at least one processor to:

determine, based on an identifier of a second antenna port number and a preset correspondence between the second antenna port number and a first antenna port number, the first antenna port number corresponding to the second antenna port number; and use the first DMRS transmitted by using the first antenna port number corresponding to the second antenna port number to demodulate the second data mapped to the target frequency domain resource of the second time-frequency resource.

14. The device according to claim 8, wherein the receiving device is a terminal device, and wherein the programming instructions instruct the at least one processor to:

receive fourth indication information sent by the network device, wherein the fourth indication information is used to indicate a ratio of a transmit power of the first DMRS to a transmit power of the second data.

* * * * *